US011700637B2

(12) United States Patent
Lou et al.

(10) Patent No.: US 11,700,637 B2
(45) Date of Patent: *Jul. 11, 2023

(54) METHODS, APPARATUSES AND SYSTEMS FOR SUPPORTING MULTI-USER TRANSMISSIONS IN A WIRELESS LOCAL AREA NETWORK (WLAN) SYSTEM

(71) Applicant: InterDigital Patent Holdings, Inc., Wilmington, DE (US)

(72) Inventors: Hanqing Lou, Syosset, NY (US); Guodong Zhang, Woodbury, NY (US); Robert L. Olesen, Huntington, NY (US); Xiaofei Wang, Cedar Grove, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,148

(22) Filed: Apr. 25, 2022

(65) Prior Publication Data

US 2022/0248457 A1 Aug. 4, 2022

Related U.S. Application Data

(63) Continuation of application No. 16/433,239, filed on Jun. 6, 2019, now Pat. No. 11,317,436, which is a (Continued)

(51) Int. Cl.
*H04W 4/00* (2018.01)
*H04W 74/00* (2009.01)
(Continued)

(52) U.S. Cl.
CPC ........ *H04W 74/006* (2013.01); *H04B 7/0452* (2013.01); *H04W 80/00* (2013.01)

(58) Field of Classification Search
CPC ... H04W 74/006; H04W 80/00; H04W 28/04; H04W 72/04; H04W 72/042; H04W 88/08; H04B 7/0452; H04L 5/0007
See application file for complete search history.

(56) References Cited

U.S. PATENT DOCUMENTS

| 8,040,834 B2 | 10/2011 | Zhang et al. |
| 9,338,789 B2 | 5/2016 | Wang et al. |
| (Continued) | | |

FOREIGN PATENT DOCUMENTS

| WO | 2012/067393 | 5/2012 |
| WO | 2016/040782 | 3/2016 |

OTHER PUBLICATIONS

Asterjadhi, "LB 203 Comment Resolution for 8.9," IEEE P802.11 Wireless LANs, LB2001 (Aug. 1, 2014).
(Continued)

*Primary Examiner* — Phuongchau Ba Nguyen
(74) *Attorney, Agent, or Firm* — Volpe Koenig

(57) ABSTRACT

Methods, devices and systems are provided for performing for multi-user (MU) transmission. A wireless transmit/receive unit (WTRU) may be configured to receive a frame, decode the received frame and determine whether the received frame is a null data packet (NDP) multi-user (MU) media access control (MAC) physical layer convergence protocol (PLCP) protocol data unit (PPDU) (NDP MU MAC PPDU) based on meeting an NDP condition. The NDP MU MAC PPDU may correspond to an MU transmission and may include a PLCP header which includes an NDP signal (SIG) field having MU control information. Based on the received frame meeting the NDP condition, the WTRU may be further configured to process the NDP SIG field, generate a response based on the NDP SIG field and the MU control information, and transmit the response.

12 Claims, 29 Drawing Sheets

Related U.S. Application Data continuation of application No. 15/541,643, filed as application No. PCT/US2016/012642 on Jan. 8, 2016, now abandoned.

(60) Provisional application No. 62/129,469, filed on Mar. 6, 2015, provisional application No. 62/101,890, filed on Jan. 9, 2015.

(51) Int. Cl.
*H04W 80/00* (2009.01)
*H04B 7/0452* (2017.01)

(56) References Cited

U.S. PATENT DOCUMENTS

| | | | | |
|---|---|---|---|---|
| 2011/0002219 A1* | 1/2011 | Kim | | H04B 7/0417 375/267 |
| 2011/0090855 A1 | 4/2011 | Kim | | |
| 2011/0128947 A1* | 6/2011 | Liu | | H04L 25/03343 370/338 |
| 2011/0235533 A1* | 9/2011 | Breit | | H04B 7/0452 370/252 |
| 2012/0140753 A1* | 6/2012 | Lee | | H04W 16/28 370/338 |
| 2012/0257567 A1* | 10/2012 | Abraham | | H04L 1/0003 370/328 |
| 2012/0327871 A1 | 12/2012 | Ghosh et al. | | |
| 2013/0107916 A1 | 5/2013 | Liu et al. | | |
| 2013/0229996 A1 | 9/2013 | Wang et al. | | |
| 2013/0286959 A1 | 10/2013 | Lou et al. | | |
| 2013/0301551 A1 | 11/2013 | Ghosh et al. | | |
| 2014/0185506 A1 | 7/2014 | Yang et al. | | |
| 2014/0204891 A1 | 7/2014 | Park et al. | | |
| 2014/0233478 A1 | 8/2014 | Wentink et al. | | |
| 2014/0348097 A1* | 11/2014 | Park | | H04L 27/2646 370/329 |
| 2015/0063128 A1* | 3/2015 | Garikipati | | H04B 7/063 370/252 |
| 2015/0085777 A1 | 3/2015 | Seok | | |
| 2015/0131517 A1 | 5/2015 | Chu et al. | | |
| 2015/0208436 A1 | 7/2015 | Seok | | |
| 2015/0311964 A1* | 10/2015 | Sohn, III | | H04B 7/0617 370/338 |
| 2015/0319700 A1 | 11/2015 | Oteri et al. | | |
| 2016/0119902 A1* | 4/2016 | Cheong | | H04B 17/309 370/329 |
| 2016/0143026 A1 | 5/2016 | Seok | | |
| 2016/0156497 A1 | 6/2016 | Yang et al. | | |
| 2016/0227533 A1 | 8/2016 | Josiam et al. | | |
| 2016/0255656 A1 | 9/2016 | Lou et al. | | |
| 2017/0033898 A1* | 2/2017 | Chun | | H04B 7/0417 |
| 2017/0170937 A1 | 6/2017 | Chun et al. | | |
| 2017/0272138 A1 | 9/2017 | Chun et al. | | |
| 2017/0273019 A1 | 9/2017 | Park et al. | | |
| 2017/0289911 A1 | 10/2017 | Kim et al. | | |
| 2018/0359761 A1* | 12/2018 | Chun | | H04W 72/21 |

OTHER PUBLICATIONS

Asterjadhi, "LB 203 Comment Resolution for 8.9," IEEE P802.11 Wireless LANs, 802.11-14/1045r1 (Aug. 1, 2014).

Baik, "TGah D0.1 Comment Collections 9 Resolutions on 24.3.8 Sections," IEEE P802.11 Wireless LANs, IEEE 802.11-11/xxxxr02 (Jul. 15, 2013).

Chu et al., "Multicast/Broadcast Communication with Acknowledge," IEEE 802.11-08/0803r1 (Jul. 2008).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz, IEEE P802.11ac/D2.0 (Jan. 2012).

IEEE P802.11ah/D4.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D0.1 (Jan. 2015).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz, IEEE Std 802.11ac (Dec. 2013).

Porat et al., "Payload Symbol Size for 11ax," IEEE 802.11-15/0099 (Jan. 12, 2015).

Stacey, "Specification Framework for TGax," IEEE P802.11 Wireless LANs, IEEE 802.11-15/0132r7 (Jul. 2015).

Zhang et al., "(LB200) TGah D1.0 PHY Comment Resolutions on Clause 24.3.11," IEEE P802.11 Wireless LANs, IEEE 802.11-11/xxxxr00 (Mar. 3, 2014).

Zheng et al., "Short Response Frame for NDP PS-Poll," IEEE 802.11-13/0082r0 (Mar. 2013).

\* cited by examiner

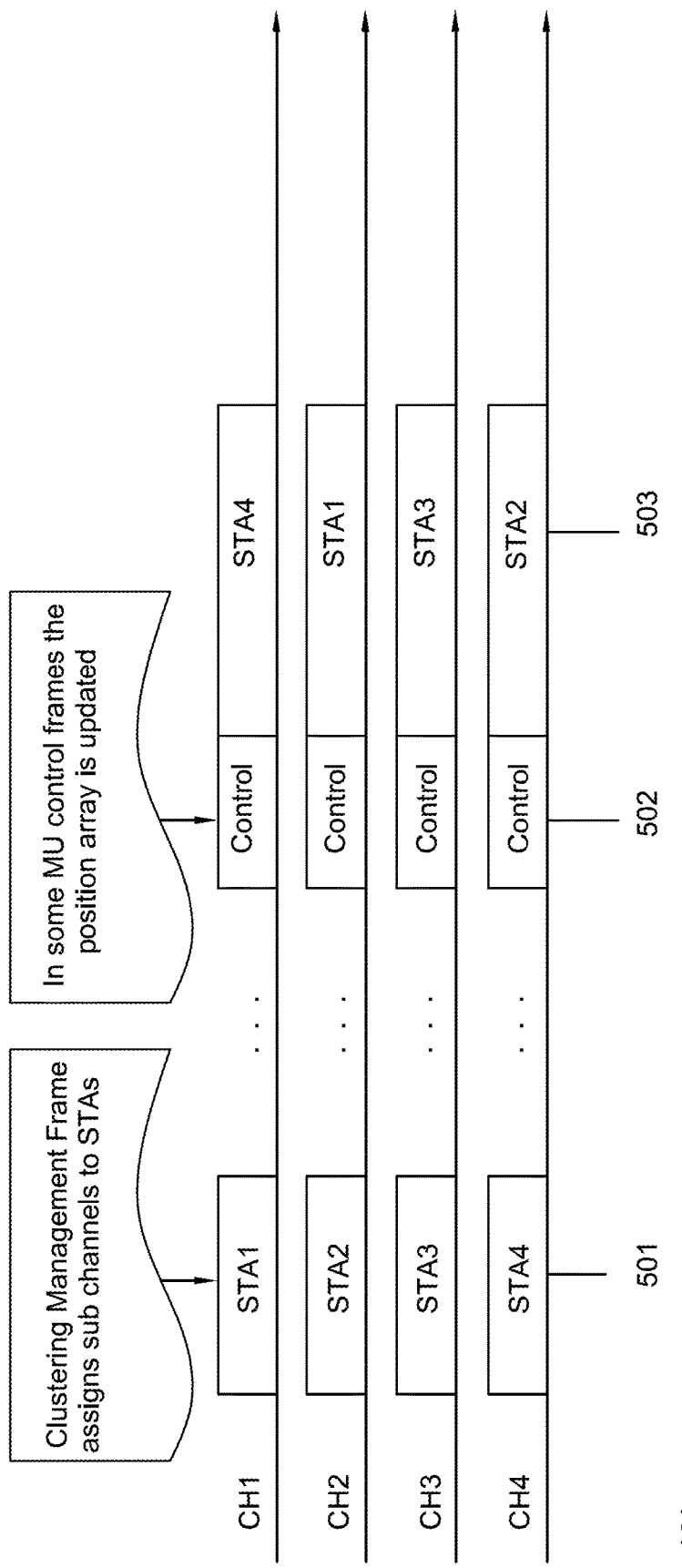

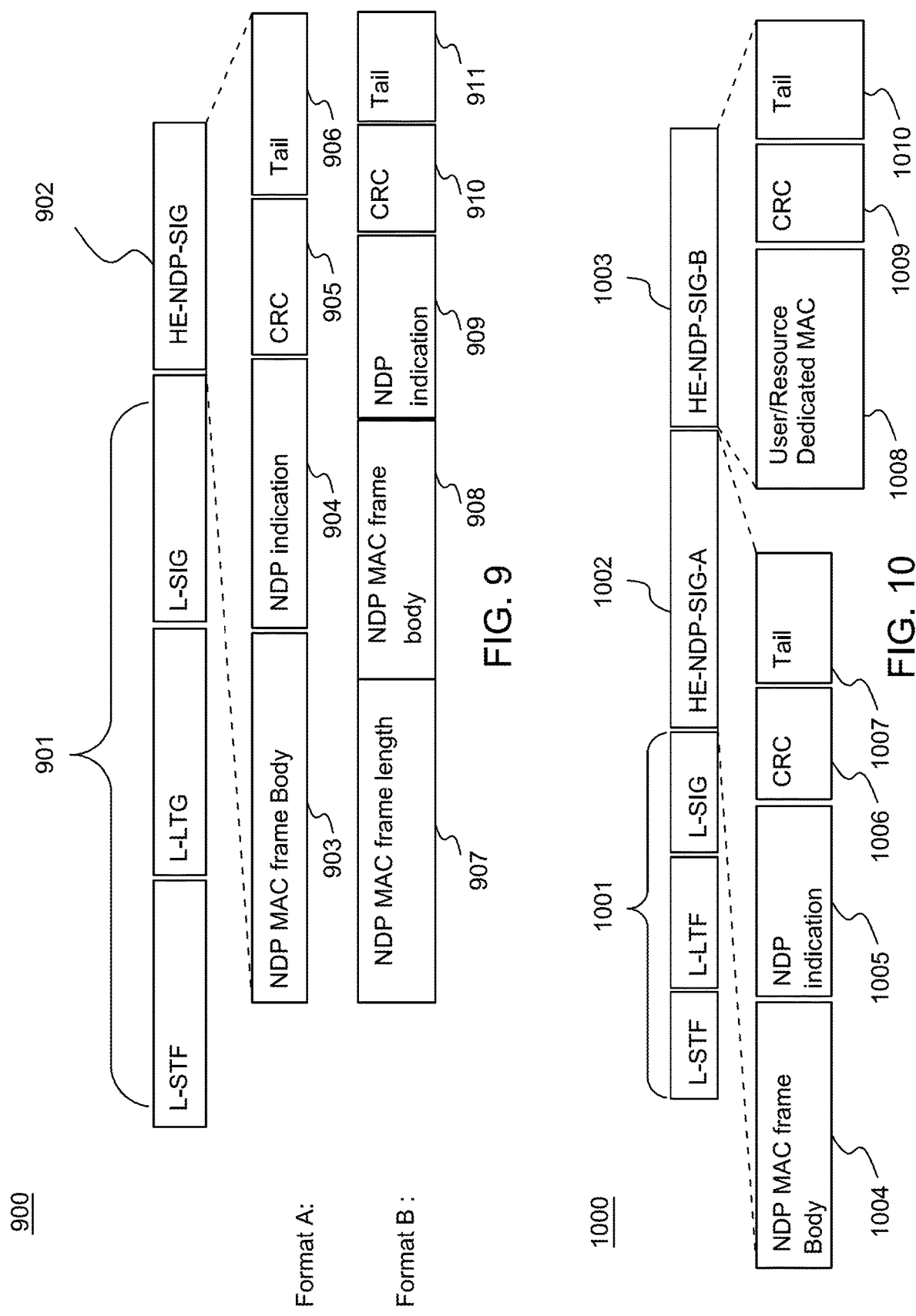

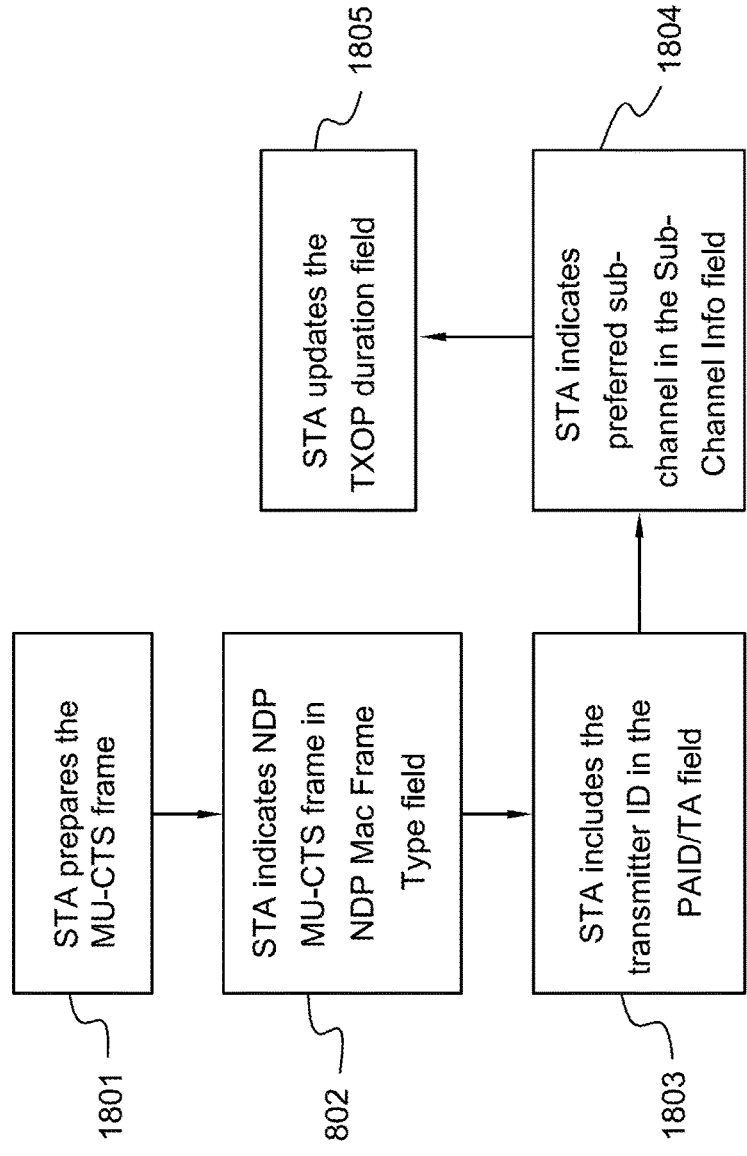

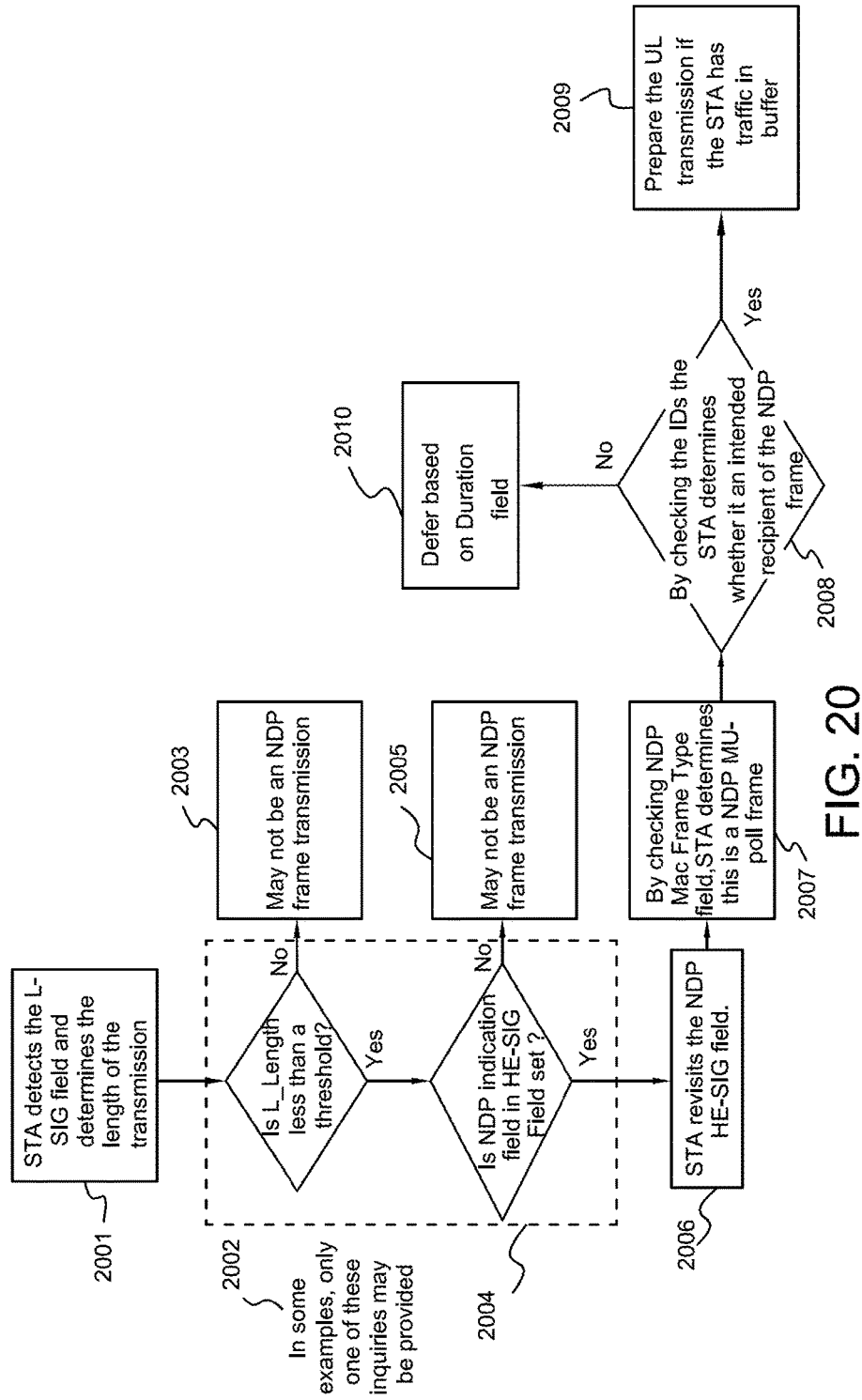

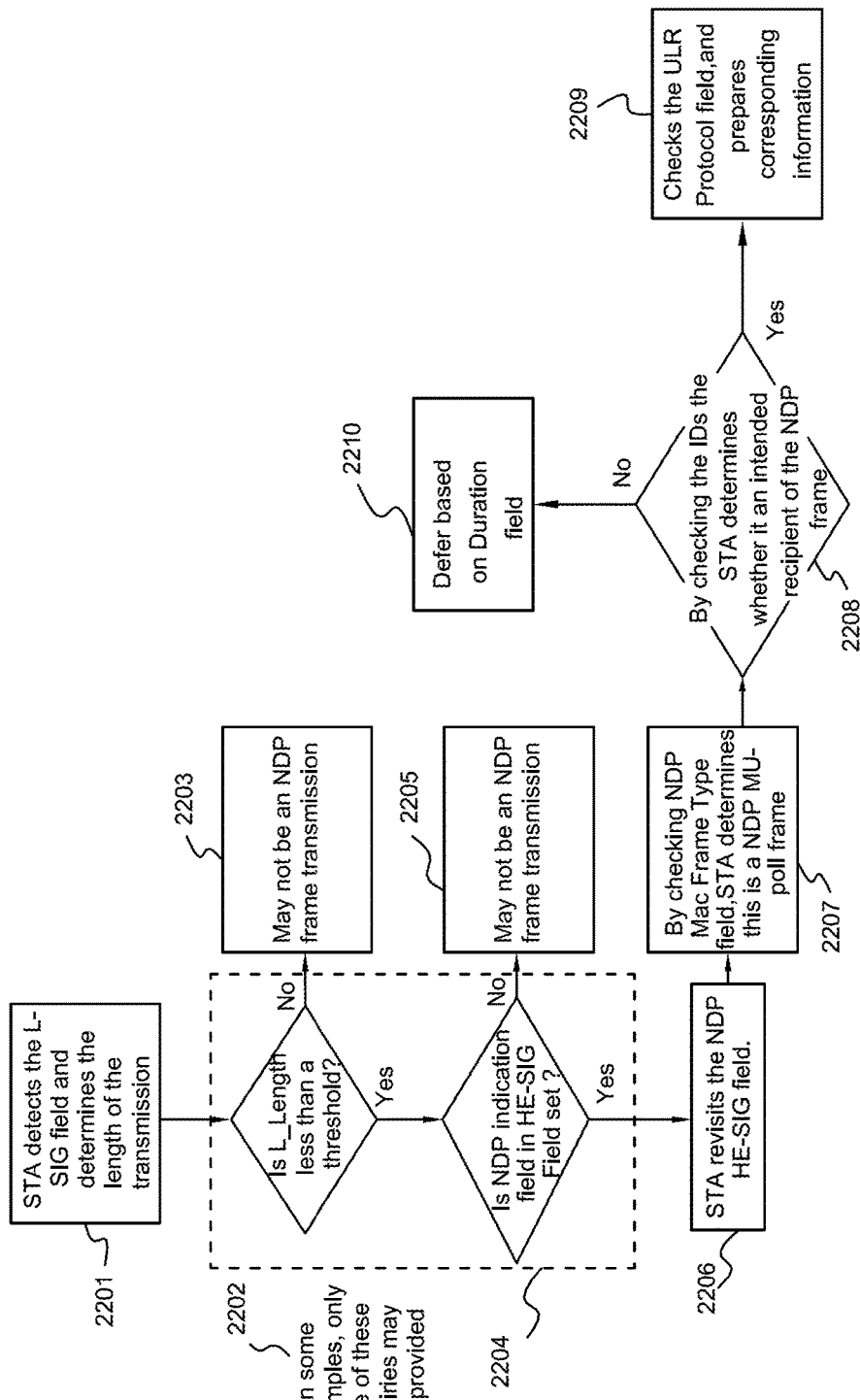

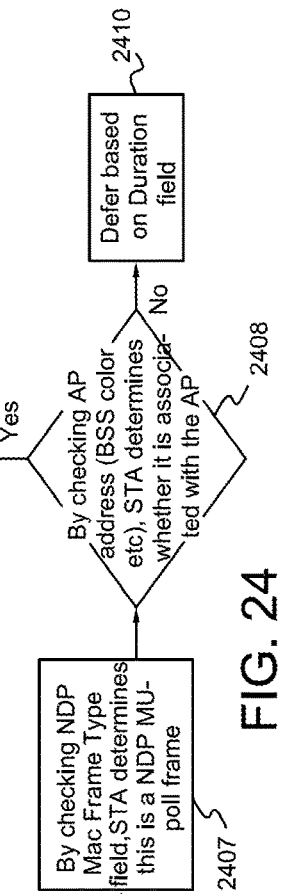
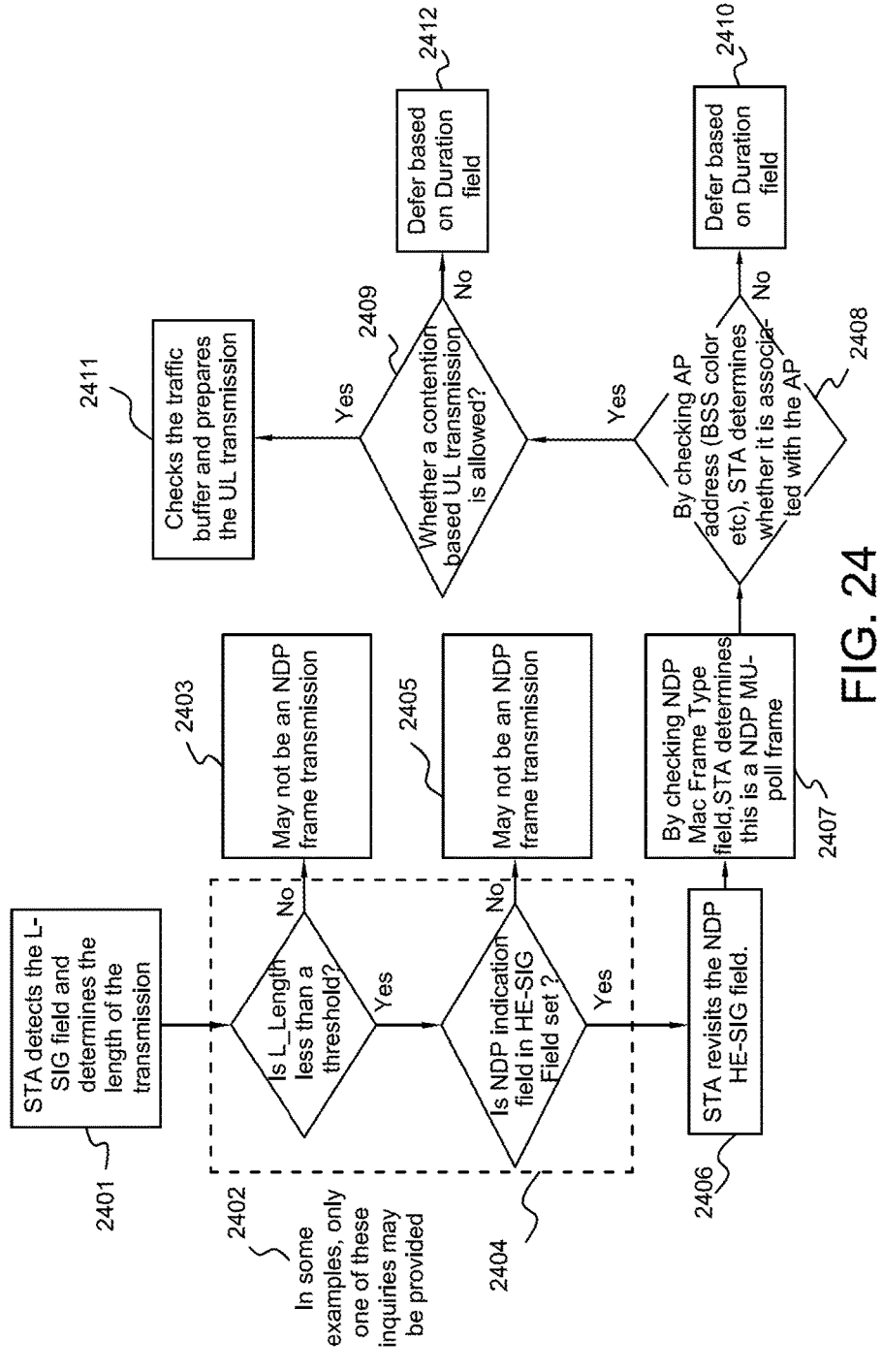

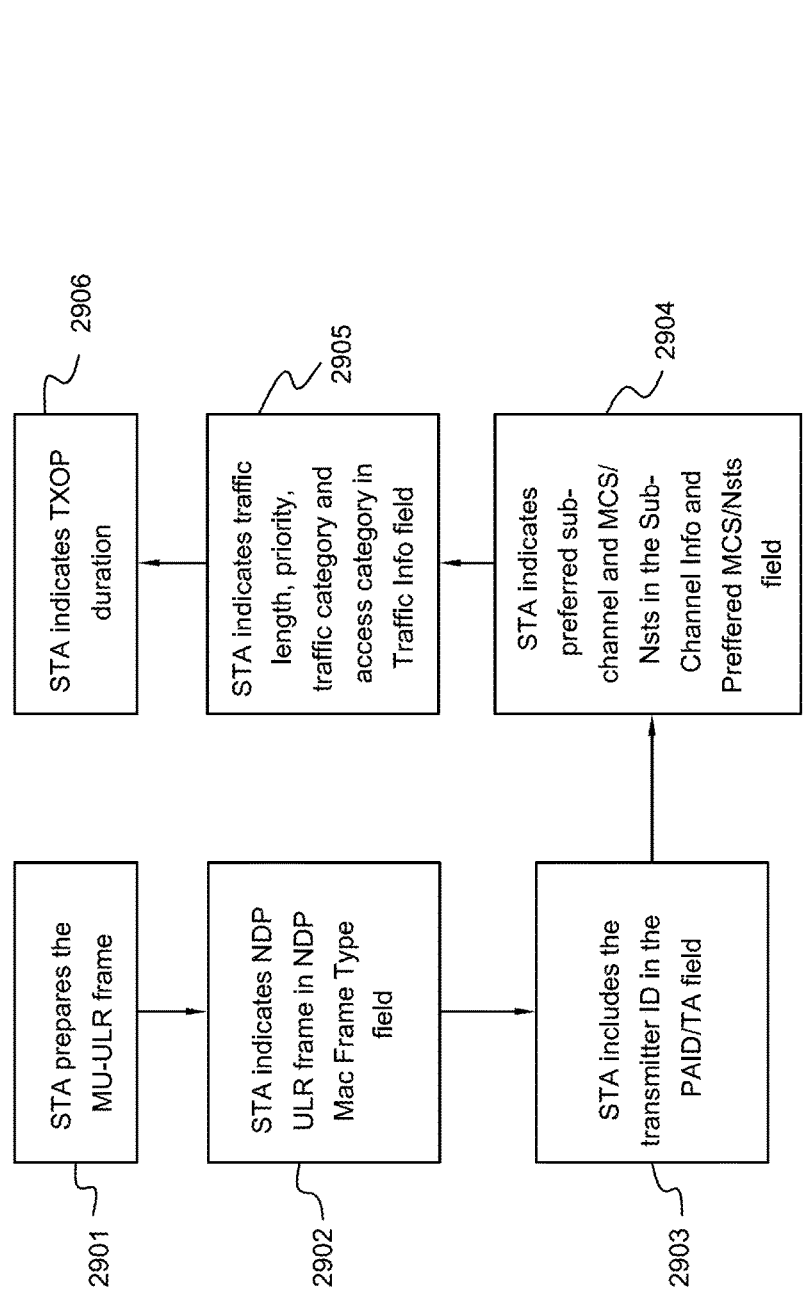

METHODS, APPARATUSES AND SYSTEMS FOR SUPPORTING MULTI-USER TRANSMISSIONS IN A WIRELESS LOCAL AREA NETWORK (WLAN) SYSTEM

CROSS REFERENCE TO RELATED APPLICATION

This application is a continuation of U.S. patent application Ser. No. 16/433,239, filed Jun. 6, 2019, which is a continuation of U.S. patent application Ser. No. 15/541,643, filed Jul. 5, 2017, which is the U.S. National Stage, under 35 U.S.C. § 371, of International Application No. PCT/US2016/012642, filed Jan. 8, 2016, which claims the benefit of U.S. Provisional Application No. 62/101,890, filed Jan. 9, 2015, and U.S. Provisional Application No. 62/129,469, filed Mar. 6, 2015, the contents of which are hereby incorporated by reference herein.

BACKGROUND

A wireless local area network (WLAN) in infrastructure basic service set (BSS) mode has an access point (AP) for the BSS and one or more stations (STAs) associated with the AP. The AP may have access to, or be able to interface with, a distribution system (DS) or other type of wired or wireless network that carries traffic in and out of the BSS. Traffic to STAs that originates from outside the BSS may arrive through the AP and be delivered to the STAs. Traffic originating from STAs to destinations outside the BSS may be sent to the AP to be delivered to the respective destinations. Traffic between STAs within the BSS may also be sent through the AP or may be sent directly between the source and destination STAs with a direct link setup (DLS), using, for example, an Institute of Electrical and Electronics Engineers (IEEE) 802.11e DLS or an IEEE 802.11z tunneled DLS (TDLS). For example, a WLAN in independent BSS mode may have no AP, and, thus, STAs may communicate directly with each other.

WLANs with very high throughput (VHT) of greater than 100 megabits per second (Mbps) on top of the medium access control (MAC) layer are being considered. To enhance system performance and achieve high data rates, VHT WLANs may include features, such as wideband transmissions, by aggregating channels. For example, in IEEE 802.11, a channel is typically 20 MHz wide, and four such 20 MHz channels may be aggregated for an 80 MHz wideband transmission. Typically, a BSS operates with a 20 MHz channel as the primary channel on which the devices (AP and STAs) of the BSS camp. In order for a device (e.g., an AP or a STA) to make a wideband transmission, it may need to aggregate one or more non-primary 20 MHz channels with the primary 20 MHz channel to make up the desired bandwidth to support the wideband transmission.

IEEE 802.11ac introduced a group identifier (ID) concept, which is used for downlink (DL) multi-user (MU) multiple-input/multiple-output (MIMO) (MU-MIMO) transmissions to enable the AP to address a group of STAs with a single group ID. However, the IEEE 802.11ac multi-user grouping mechanism cannot support large numbers of clusters for multiple MU transmission schemes, a combination of orthogonal frequency-division multiple access (OFDMA) clusters and orthogonal frequency-division multiplexing (OFDM) MU-MIMO groups, or flexible clustering and scheduling mechanisms which may enable the per-transmission clustering and scheduling. Furthermore, current MU control frames are overhead and decrease MAC efficiency.

SUMMARY

Methods, apparatuses and systems for multi-user transmission are described. A wireless transmit/receive unit (WTRU) may include a receiver, a transmitter and at least one processor, and may be configured to receive a frame, decode the received frame and determine whether the received frame is a null data packet (NDP) multi-user (MU) media access control (MAC) physical layer convergence protocol (PLCP) protocol data unit (PPDU) (NDP MU MAC PPDU) based on meeting an NDP condition. The NDP MU MAC PPDU may correspond to an MU transmission and may include a PLCP header which includes an NDP signal (SIG) field having MU control information. Based on the received frame meeting the NDP condition, the WTRU may be further configured to process the NDP SIG field, generate a response based on the NDP SIG field and the MU control information, and transmit the response.

In another example, the WTRU may be configured to receive a null data packet (NDP) multi-user (MU) media access control (MAC) physical layer convergence protocol (PLCP) protocol data unit (PPDU) (NDP MU MAC PPDU) related to an MU transmission. The NDP MU MAC PPDU may include a PLCP header which includes an NDP signal (SIG) field having MU control information and the NDP SIG field may indicate a NDP MAC frame type of the NDP MU MAC PPDU. The WTRU may be configured to determine the NDP MAC frame type from the NDP SIG field and generate a response based on the determined NDP MAC frame type and the MU control information.

BRIEF DESCRIPTION OF THE DRAWINGS

A more detailed understanding may be had from the following description, given by way of example in conjunction with the accompanying drawings wherein:

FIG. 5 is a diagram of an example of an alternative procedure for updating a position bit-field per transmission;

FIG. 6 is a diagram of an example null data packet (NDP) MAC frame body;

FIG. 9 is a diagram of an example high efficiency (HE) NDP MAC physical layer convergence protocol (PLCP) protocol data unit (PPDU) according to a first example HE NDP MAC PPDU;

FIG. 10 is a diagram of an example HE NDP MAC PPDU according to a second example HE NDP MAC PPDU embodiment;

FIG. 17 is a diagram of an example embodiment of an HE NDP multi-user-clear-to-send (MU-CTS) frame body;

FIG. 18 is a flow diagram of example HE MU procedures using the example NDP MU control frame of FIG. 17;

FIG. 19 is a diagram of a first example NDP MU-Poll frame body embodiment;

FIG. 20 is a flow diagram of example HE MU procedures using the example NDP MU control frame of FIG. 19;

FIG. 21 is a diagram of a second example NDP MU-Poll frame body embodiment;

FIG. 22 is a flow diagram of example HE MU procedures using the example NDP MU control frame of FIG. 21;

FIG. 23 is a diagram of a third example NDP MU-Poll frame body embodiment;

FIG. 24 is a flow diagram of example HE MU procedures using the example NDP MU control frame of FIG. 23;

FIG. 28 is a diagram of an example HE NDP uplink response/request (ULR) frame body;

FIG. 29 is a flow diagram of example HE MU procedures using the example NDP MU control frame of FIG. 28;

DETAILED DESCRIPTION

Figure 1A:
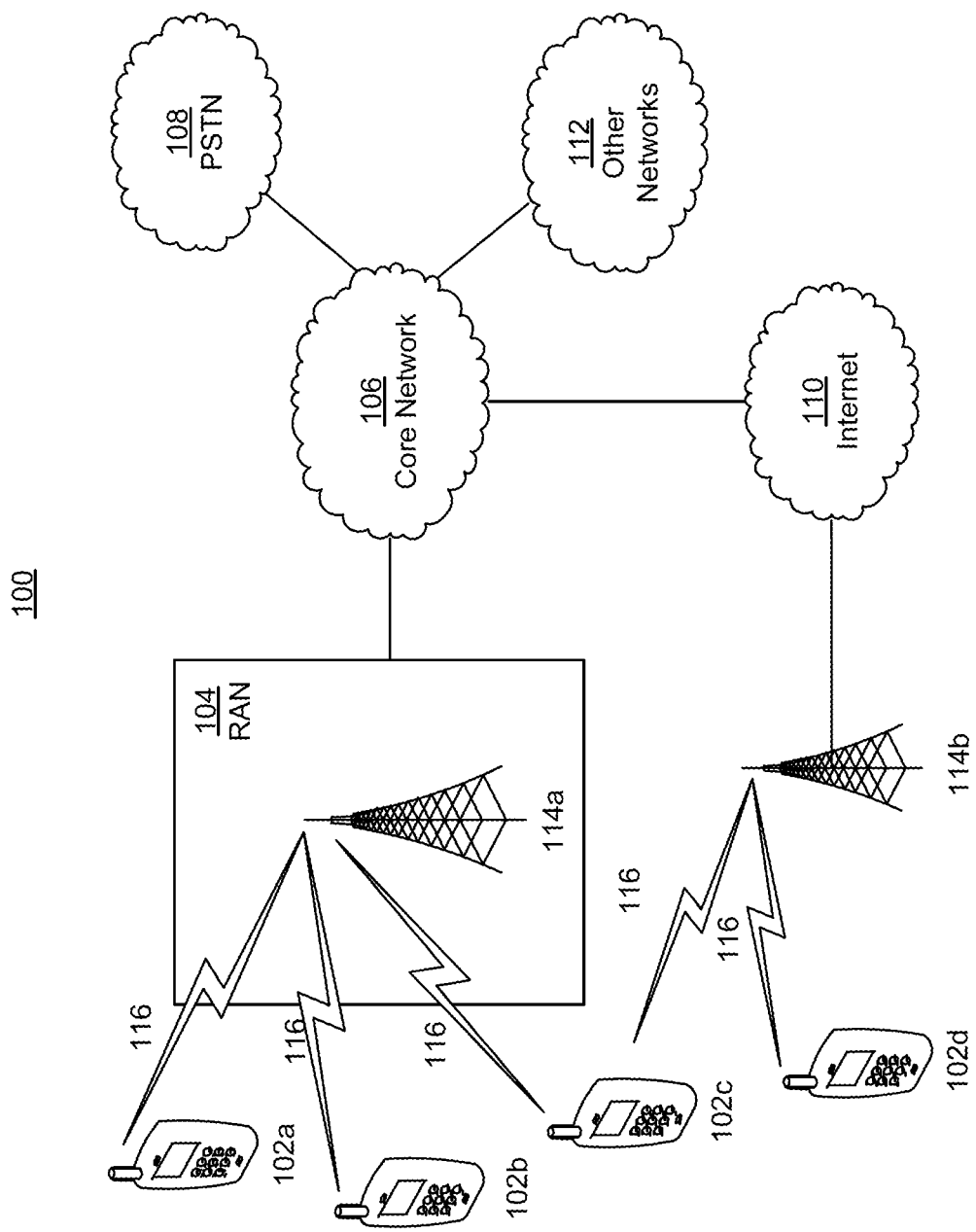
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station (STA), a fixed or mobile subscriber unit, a pager, a cellular telephone, a personal digital assistant (PDA), a smartphone, a laptop, a netbook, a personal computer, a wireless sensor, consumer electronics, and the like. WTRU, UE, STA and the like may be used interchangeably throughout.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
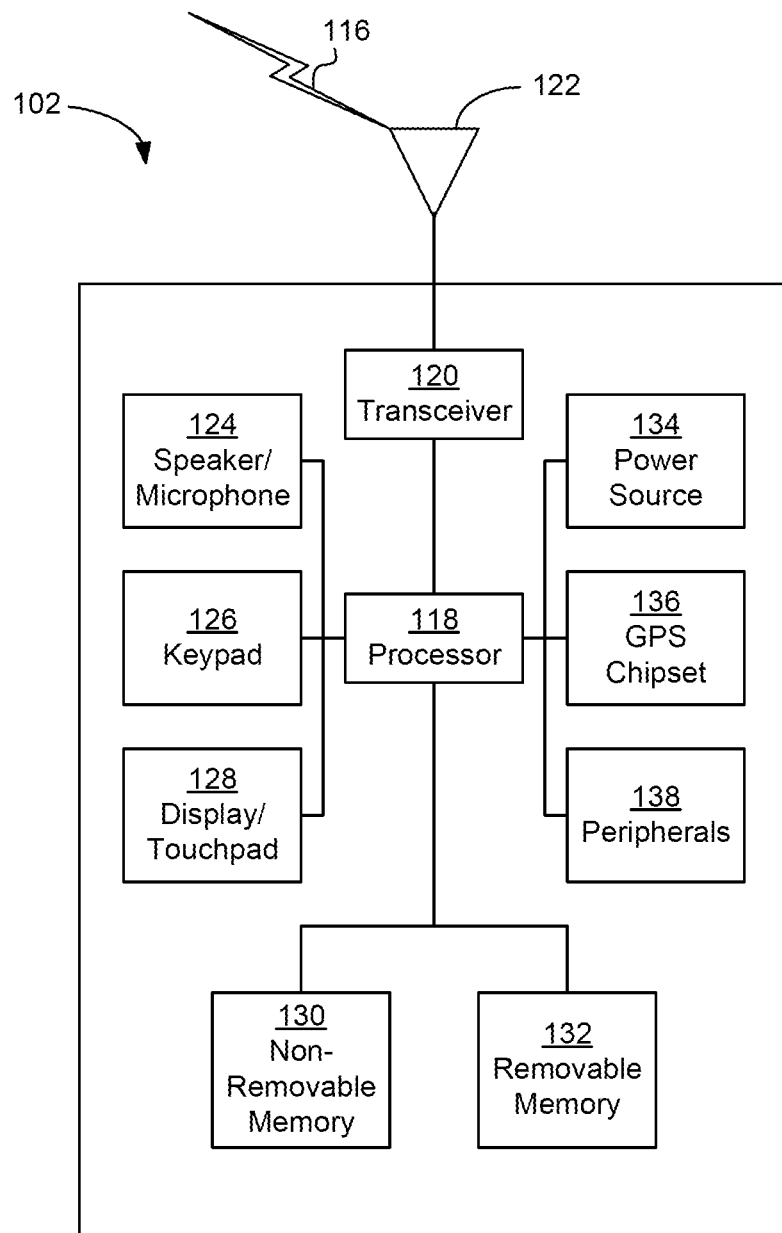
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
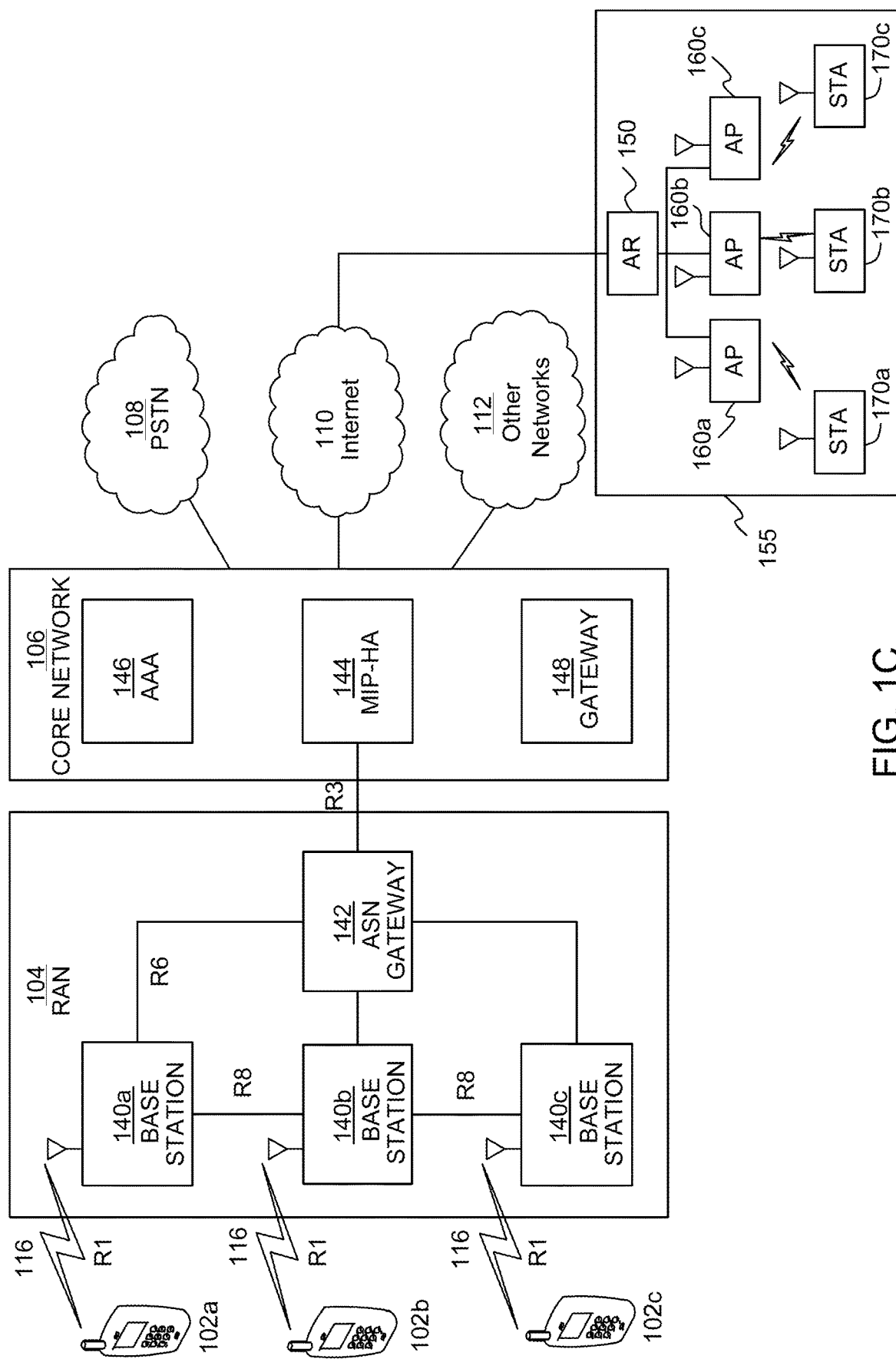
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2A:
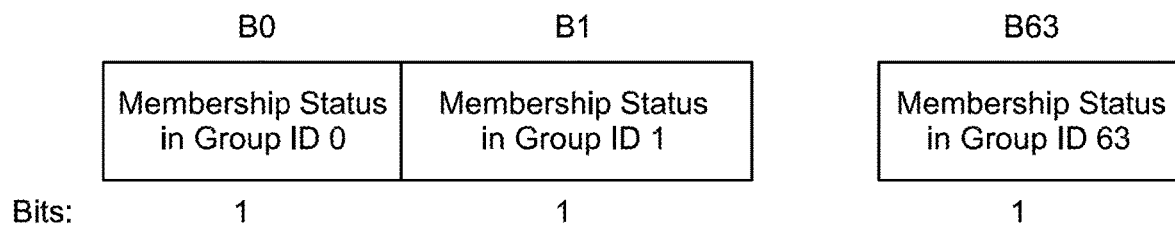
FIG. 2A is diagram of an example membership status array field.
Figure 2B:
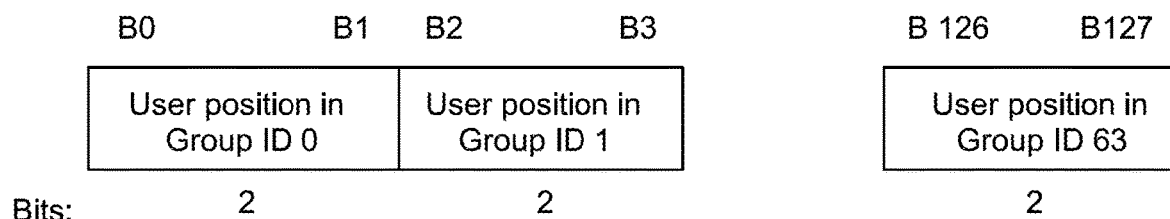
FIG. 2B is a diagram of an example user position array field.

IEEE 802.11ac introduced a group ID concept, which is mainly used for downlink (DL) multi-user multiple-input/multiple-output (MIMO) (MU-MIMO) transmissions to enable the AP to address a group of STAs with a single group ID. The single group ID may be included in a VHT signal A (VHT-SIG-A) field of a physical layer frame. A Signal field is used to describe the data payload of the physical layer frame. The purpose of the Signal field is to help the receiver decode the data payload, which is done by describing the parameters used for transmission. 802.11ac separates the signal into two different parts, called the Signal A and Signal B fields (i.e., SIG-A and SIG-B fields). The former is in the part of the physical layer header that is received identically by all receivers; the latter is in the part of the physical layer header that is different for each multi-user receiver. In the IEEE 802.11ac standard, the AP may use group ID management frames to assign a group ID to STAs. Group ID management frames may be addressed to the individual STAs and may include a membership status array and a user position array. FIG. 2A is a diagram of an example membership status array field, which may indicate the receiving STA's membership in one or more groups. FIG. 2B is a diagram of an example user position array field, which may indicate the receiving STA's position within each of the groups that it is a member of.

An IEEE 802.11ah task group has been established to develop support for WiFi systems in the sub 1 GHz band. The IEEE 802.11ah physical layer (PHY) is required to support 1, 2, 4, 8, and 16 MHz bandwidths. Null data packets (NDPs) have been introduced in the IEEE 802.11ah standard to carry simple control and management information, including definition of NDP Clear-To-Send (CTS) frames, NDP Contention-Free End (CF-End) frames, NDP Power-Save Poll (PS Poll) frames, NDP Acknowledgement (ACK) frames, NDP Block Acknowledgement (BA) frames, NDP Beamforming Report Poll frames, NDP Paging frames, and NDP Probe Request frames. Coordinated orthogonal block-based resource allocation (COBRA), MU parallel channel access (MU-PCA), uplink (UL) MU-MIMO, and preamble designs have previously addressed alternative aspects of simultaneous multi-user transmissions.

Figure 3A:
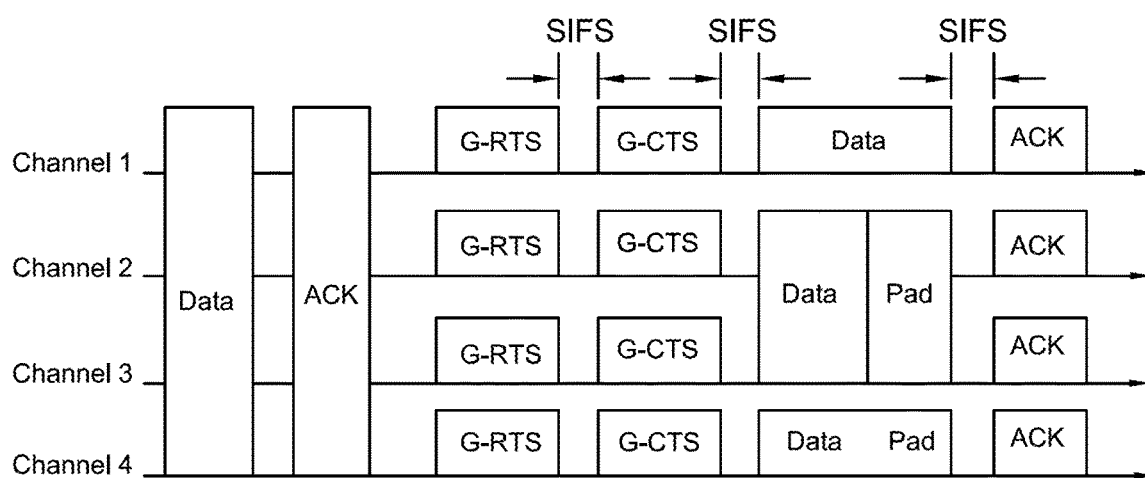
FIG. 3A is a diagram of an example downlink multi-user channel access scheme.

FIG. 3A is a diagram of an example downlink (DL) multi-user channel access scheme. The example multi-user channel access scheme illustrated in FIG. 3A includes two control frames, group-request to send (G-RTS) and group-clear to send (G-CTS). A G-RTS frame (also referred to as a DL schedule frame) may be used by an AP to reserve the channel for downlink MU transmissions as well as for downlink resource allocation. A G-CTS frame may be transmitted by non-AP STAs and may be used to confirm the reception of a G-RTS frame and acknowledge to the AP that the STA is ready for a DL MU transmission.

Figure 3B:
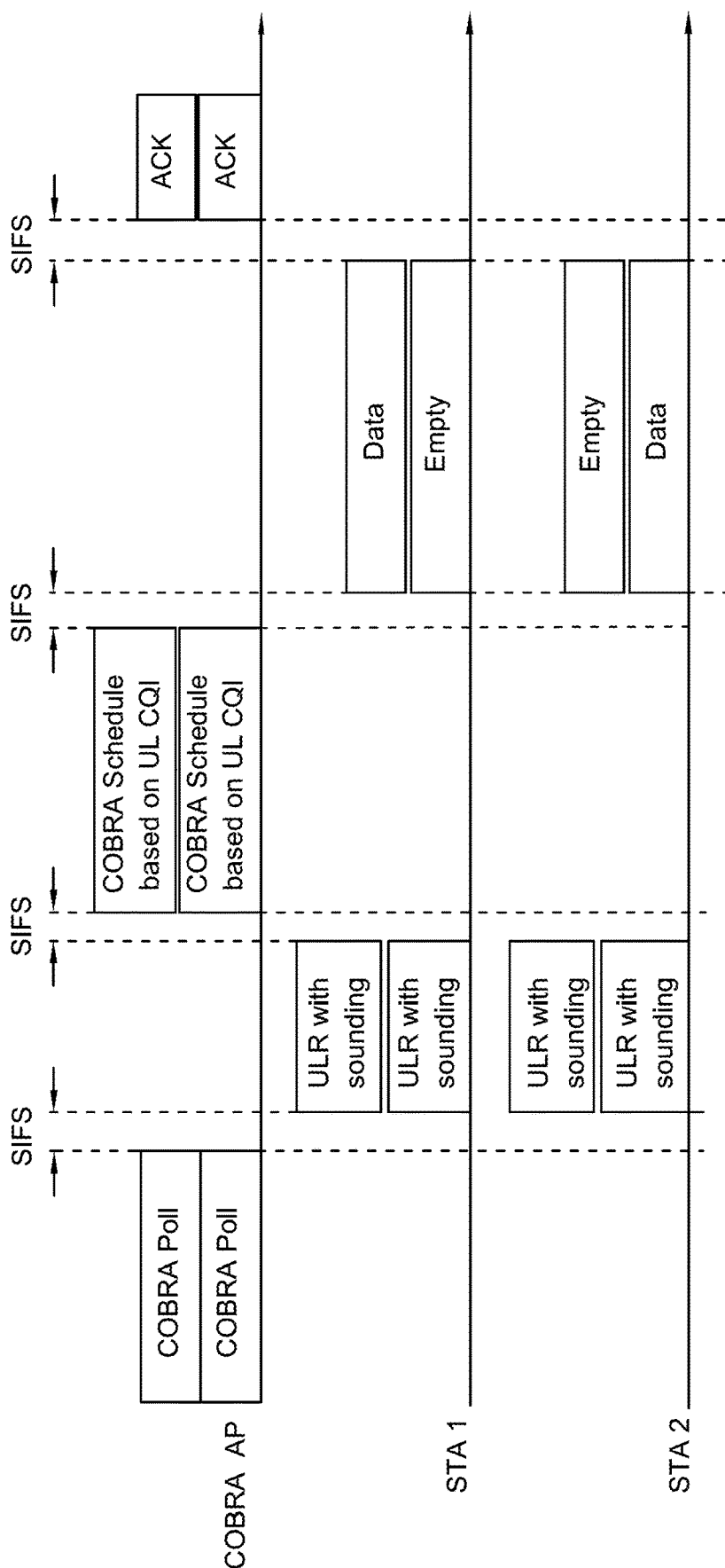
FIG. 3B is a diagram of an example uplink (UL) multi-user channel access scheme.

FIG. 3B is a diagram of an example uplink (UL) multi-user channel access scheme. The example multi-user channel access scheme illustrated in FIG. 3B includes a COBRA poll frame, a UL response/request (ULR) frame, a COBRA schedule frame and an MU ACK frame, with short inter-frame spaces (SIFSs) therebetween. The COBRA poll frame may be used to poll multiple STAs for uplink transmissions and may also be referred to, for example, as an MU-Poll frame, a G-Poll frame, or an MU-Request. A ULR frame may be used by STAs to respond to the Poll frame or to request uplink transmission and may also be referred to, for example, as an MU-Request or an MU-Response. A COBRA schedule frame may be used by an AP to schedule uplink transmissions, and may be based on UL channel quality indication (CQI). An MU ACK frame may be used by an AP to acknowledge the reception of the previous uplink transmissions.

For multi-user transmission, an AP may need to schedule a group of STAs for MU communications for a scheduling interval (also referred to herein as a cluster). For a cluster, it may be desirable to have more dynamic and flexible grouping than is used in the IEEE 802.11ac grouping procedures described above to ensure that system spectral efficiency is acceptable.

For example, grouping procedures and associated group ID mechanisms described above with respect to IEEE 802.11ac only support one multi-user transmission scheme (downlink MU-MIMO), the number of supported DL MU-MIMO groups is limited (e.g., up to 62 group IDs), and the number of simultaneous users is also limited (e.g., up to 4 users). Next generation WLAN systems may need to use multiple MU transmission schemes in both the DL and UL, which may require support for many more groups, each of which may need to support more users.

As another example, the MU scheduling scheme described above is not flexible at least because the AP needs to perform separate unicast transmissions of the group management frame, which includes the information regarding user positions within a group. Further, during the MU data transmission, there is no mechanism to modify either the membership or user positions even when channel conditions have been significantly changed since the previous group management frame transmission.

Embodiments described herein provide for new MU clustering and scheduling mechanisms, which may support a large number of clusters for multiple MU transmission schemes, a combination of OFDMA clusters and OFDM MU-MIMO groups, and flexible clustering and scheduling mechanisms that may enable per-transmission scheduling. Further, new MU control frames are defined herein to enable scheduling of multiple user transmissions. For example, MU control frames are defined to enable an AP to first poll the STAs and to enable the STAs to reply to the poll frame for uplink MU transmission. Further, because MU control frames are often considered as extra overhead to MAC efficiency, embodiments described herein provide schemes to further reduce the overhead of MU control frames to improve control overhead efficiency. For example, MU transmission may only be desirable when the throughput ratio of MU transmissions to single user (SU) transmissions is higher than a particular threshold. Accordingly, embodiments described herein may limit control overhead, for example, by setting a maximum control frame duration.

Embodiments are described below, which may enable an AP to manage MU clusters and may support a large number of clusters for multiple simultaneous OFDM-MU-MIMO transmission schemes and flexible clustering and scheduling mechanisms that may enable per-transmission scheduling. Four specific embodiments of MU clustering and scheduling mechanisms are described as examples, and one of ordinary skill in the art will understand that other clustering and scheduling mechanisms are possible within the scope of the described examples.

Further, in order to synchronize between multiple users and acquire the traffic information for each user, UL MU transmissions may require extra control overhead. Traffic information may include, for example, whether a STA has data to send and any requirements for scheduling the MU UL transmission (e.g., quality of service (QoS), traffic load, traffic ID, or traffic category). For example, MU transmissions may only be desirable when the throughput ratio of MU transmissions to single user (SU) transmissions is higher than a particular threshold. Accordingly, embodiments are also described below where UL MU control overhead may be required to satisfy one or more conditions.

In an exemplary embodiment of an MU clustering and scheduling mechanism, an AP may transmit a clustering management frame to a STA or a cluster of STAs that belong to one or more channels. The clustering management frame may include at least a membership bit-field and a position bit field.

The membership bit-field may include an array of N bits, where N is the number of members in the cluster. The kth bit in the array may be used to indicate whether the STA belongs to the kth clustering (k=0, ... N−1). N may be pre-defined or signaled, for example, in a beacon frame or in the clustering management frame. When N is signaled in a beacon frame, N may remain the same for one or more beacon intervals such that the number of groups supported by the AP may remain the same for these beacon intervals. When N is signaled in the clustering management frame, N may be increased or decreased by the AP using the clustering management frame.

The position bit-field may include mN bits, where m is the number of simultaneous users. Here, each group may have m bits to signal the position of the users, and m may be pre-defined or signaled, for example, in the beacon frame or in the clustering management frame. When m is signaled in the beacon frame, m may remain the same for one or more beacon intervals. When m is signaled in the management frame, m may be increased or decreased by the AP using the clustering management frame.

In an example, the AP may define different clusters based on, for example, different MU transmission schemes. For example, the AP may define clusters for each of downlink OFDM MU-MIMO (per channel) transmission schemes, uplink OFDM MU-MIMO (per channel) transmission schemes, downlink OFDMA (one or more channels) transmission schemes and uplink OFDMA (one or more channels) transmission schemes. With respect to downlink and uplink OFDM MU-MIMO schemes, OFDM MU-MIMO may or may not be used in combination with OFDMA clusters, and an OFDM MU-MIMO operation may be backward compatible to VHT capabilities whether or not it is in combination with OFDMA clusters. With respect to downlink OFDMA clusters, downlink OFDMA may use one or more channels and/or more than one sub-channel within a channel, wherein clusters may be defined for transmissions using more than one channel and/or sub-channel. With respect to uplink OFDMA clusters, uplink OFDMA may use either more than one channel or more than one sub-channel within a channel.

In another example, the AP may define one cluster with a relatively large N. Here, each MU transmission scheme may be assigned to use a certain range of the cluster IDs, and, in some cases, each MU transmission scheme may be assigned to use a certain range of the cluster IDs in combination with Group IDs. The number of cluster IDs used by each transmission scheme may be determined in one of a number of different ways, such as using specifications ("fixed scenario") or using system signaling ("flexible scenario").

In the flexible scenario, the AP may include an MU transmission cluster arrangement element in the Beacon frame. The MU transmission cluster arrangement element may define the relationship between an MU transmission mode and a cluster ID range. For example, for MU mode 0, the relationship may remain unchanged during one or more Beacon intervals. The MU transmission cluster arrangement element may be transmitted in every Beacon frame or periodically in every M Beacon frames. In an alternative example, this element may be transmitted when the AP intends to update the cluster ID range assignment. In this way, the cluster ID may imply the MU transmission mode. Thus, in the SIG field of each transmission, when the cluster ID is present, the MU transmission mode may not be needed. In another example of the flexible scenario, the MU cluster range assignment may be included in the cluster management frame.

For MU transmissions, the AP may signal the cluster ID in the SIG field. The cluster ID may represent the corresponding group membership (e.g., membership array) and positions (e.g., position array) within each group. Thus, the cluster of users may acquire the resource block assigned for them by the cluster ID. The cluster ID may not be unique, especially in a densely deployed system with overlapping base station subsystem (OBSS). Therefore, users with a signaled cluster ID may need to check the MAC header to confirm the intended receiver of the packet.

The membership array and position array may be assigned and updated within the clustering management frame. Further, a combination of MU-MIMO and OFDMA may be possible. In this case, the cluster definition may be unique for each of the OFDM MU-MIMO and OFDMA transmission schemes. Alternatively, a cluster definition may be a combination of both for either DL or UL transmissions.

In another exemplary embodiment of an MU clustering and scheduling mechanism, the clustering management frame may have the same format as that defined for the first embodiment of the MU clustering and scheduling mechanism. However, in this embodiment, the position bit-field may be updated with each new transmission opportunity (TxOP).

Figure 4:
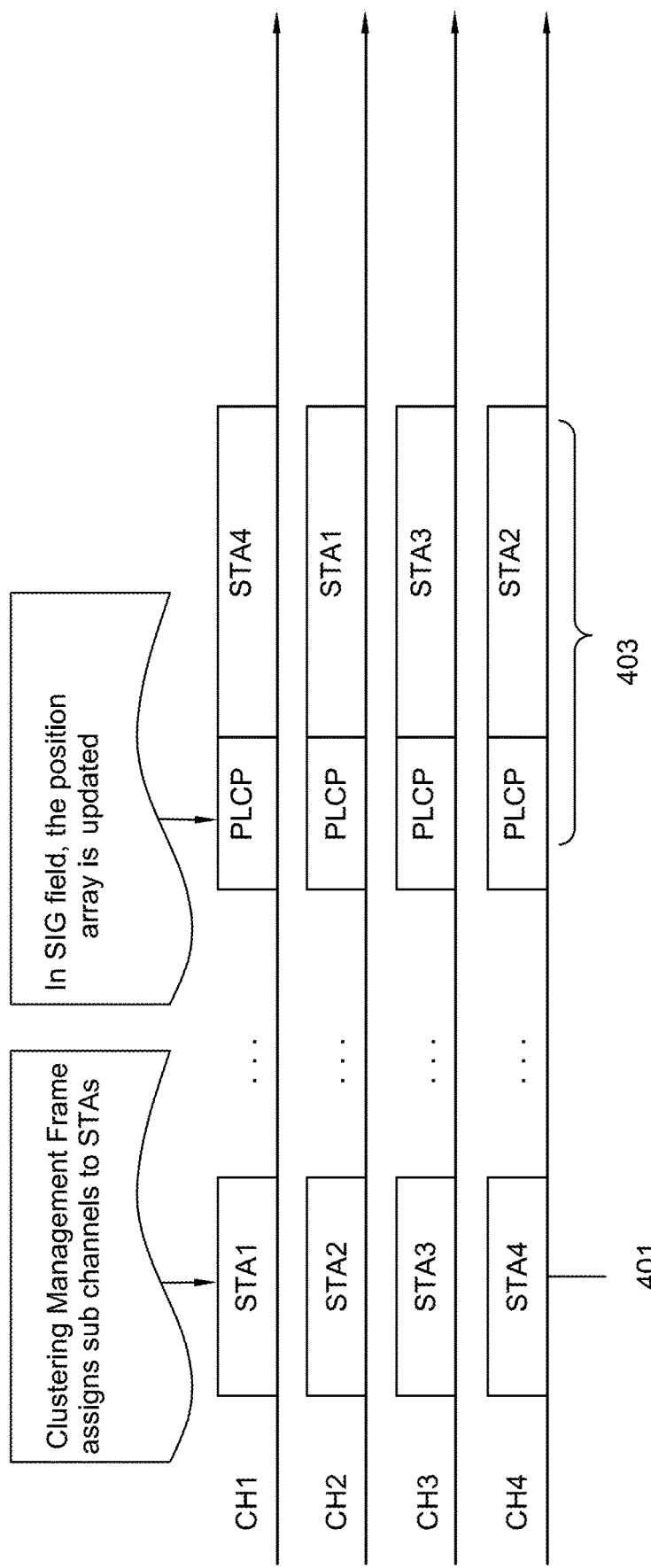
FIG. 4 is a diagram of an example procedure for updating a position bit-field per transmission.

FIG. 4 is a diagram of an example procedure for updating a position bit-field per transmission. FIG. 4 shows clustering management frames 401 and packets 403 transmitted for a MU transmission on the sub-channels. In the example illustrated in FIG. 4, the membership bit-field and position bit-field may be signaled in the clustering management frame and the position bit-field may be updated in the SIG field, which is included in the physical layer convergence protocol (PLCP) header of the packet. The packet may be a data session/packet, and, more specifically, a PLCP protocol data unit (PPDU), which is a composite frame comprising a MAC protocol data unit (MPDU) with an additional PLCP preamble and header appended thereto. In this example, in the clustering management frame, for the kth cluster, sub-channels 1, 2, 3, and 4 are assigned to STAs 1, 2, 3, and 4, respectively. In the MU transmission, which may be either a downlink transmission or an uplink transmission, cluster k may be signaled in the PLCP header to indicate the transmission is for STAs 1, 2, 3 and 4. In the PLCP header, there may be a new subfield, which may indicate the position of the users in the cluster. The subfield may include a mapping from the position defined in the cluster management frame to the position used in the particular MU transmission. In this example, STA1 used to be in position 1 (sub-channel 1) and now is assigned to position 2. STA2 is mapped from position 2 to position 4, STA3 remains in the same position, and STA4 is moved from position 4 to position 1. In general, this mapping may modify not only the positon of each user, but also the number of resources assigned to each user (e.g., multiple sub-channel assignments). For example, a user may be assigned to use one sub-channel, while in the real MU transmission, this user may not be assigned any sub-channel, or it may be assigned to more than one sub-channel.

FIG. 5 is a diagram of an example of an alternative procedure for updating a position bit-field per transmission. FIG. 5 shows clustering management frames 501, MU control frames 502 and packets 503 for a MU transmission on the sub-channels. In the example illustrated in FIG. 5, the membership bit-field and position bit-field may be signaled in the clustering management frame. In addition, the position bit-field may be updated in one or more of the MU control frames, which may be transmitted before the data session/packet. The MU control frame may include a mapping, which may map the position defined in the cluster management frame to the position used in the ongoing MU transmission. The mapping may be carried in the SIG field or MAC body of the MU control frame. In an example, the MU control frame may be replaced by any frame transmitted before the MU data transmission, which may include control, scheduling or management information for the MU data transmission.

In another exemplary embodiment of an MU clustering and scheduling mechanism, the cluster ID may be assigned using an NDP MAC frame. The NDP PLCP protocol data unit (PPDU) format may follow any of the designs described below.

FIG. 6 is a diagram of an example NDP MAC frame body 600. In the example illustrated in FIG. 6, the NDP Mac Frame Type subfield 601 may be used to indicate that the frame is an NDP cluster ID assignment frame, the MU mode subfield 602 may be used to indicate the type of MU transmission mode, the AP address subfield 603 may include a compressed AP address (e.g., partial basic service set identification (BSSID)), the partial association ID (PAID) subfield 604 may include a PAID of the STA, and the assigned cluster ID subfield 605 may be used to indicate the assigned cluster ID. The reserved subfield 606 is not currently used and is reserved for future use.

In another exemplary embodiment of an MU clustering and scheduling mechanism, a cluster ID may not be employed, and a separate clustering management frame may not be necessary. The clustering membership and position may be signaled in the MU transmission, either in the control frame immediately preceding the MU data session or in the PLCP header/SIG field in the MU data transmission session.

Figure 7:
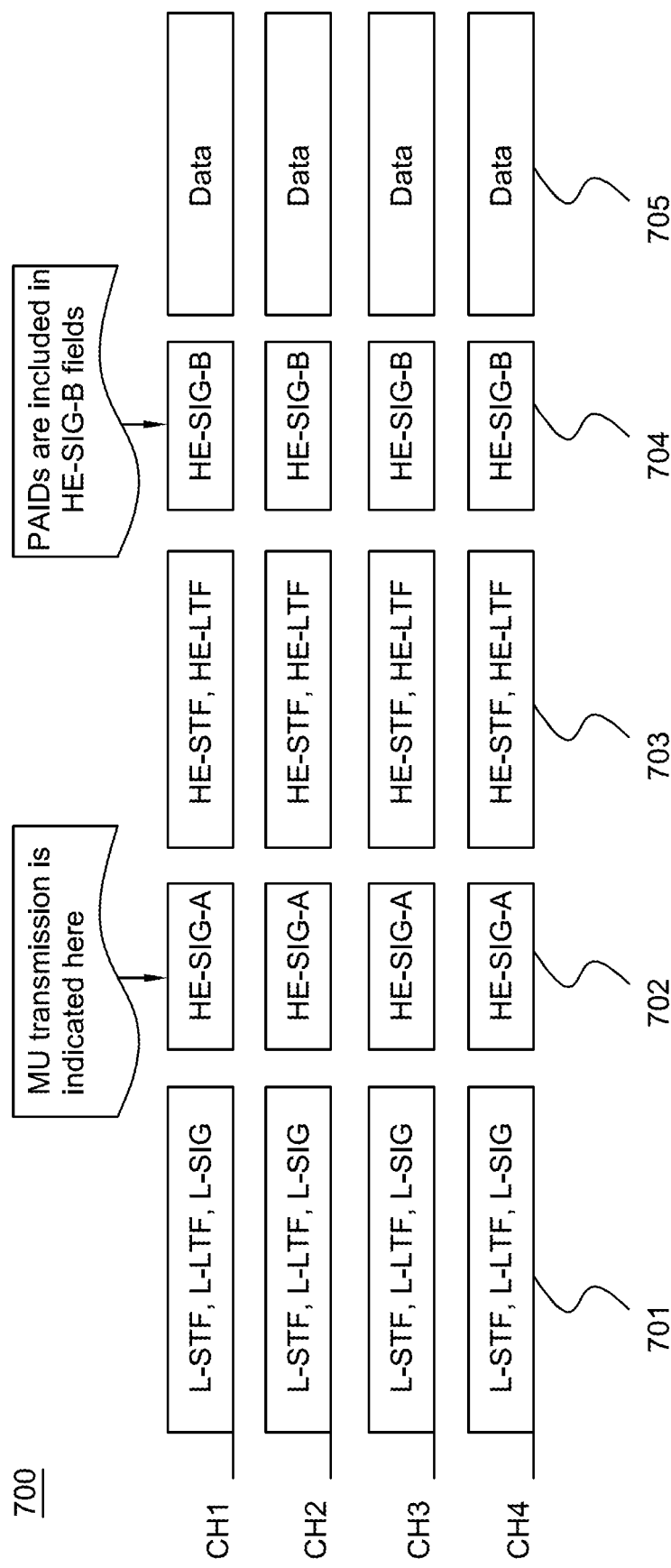
FIG. 7 is a diagram of an example multi-user (MU) clustering mechanism in which MU clustering is signaled on an MU data transmission.

FIG. 7 is a diagram of an example MU clustering mechanism in which MU clustering is signaled on an MU data transmission. In the example illustrated in FIG. 7, a downlink MU transmission may be initiated by an AP, and the AP may not signal any cluster-related information before this transmission. The AP may follow the following procedures to assign the MU cluster. The AP may acquire the media after clear-channel assessment (CCA) and backoff procedures. In the illustrated example, the AP acquires a channel with four sub-channels. The AP may plan to perform an MU transmission. In the illustrated example, the AP plans to transmit to four STAs simultaneously using an OFDMA scheme. The AP may prepare, for a MU transmission 700, a PPDU which includes a legacy STF, LTF and SIG field 701, including a legacy short training field (L-STF), a legacy long training field (L-LTF) and a legacy SIG (L-SIG) field, a common SIG field 702 (e.g., high-efficiency SIG-A (HE-SIG-A) field), a high-efficiency (HE) STF and LTF field 703, a dedicated SIG field 704 (e.g., high-efficiency SIG-B (HE SIG-B) field), and a data field 705. The legacy fields may enable the system to be backward compatible with other IEEE 802.11 standards, e.g., 802.11a/g, 802.11n, etc.

The common SIG field 702 may be used to carry information to all the users/STAs in the cluster. The MU transmission mode may be signaled in the common SIG field, which may be transmitted on all of the acquired sub-channels and/or with an omni antenna pattern. Thus, it may be decoded by all the users. In the illustrated example, the HE-SIG-A field is the common SIG field, which is modulated and transmitted on each sub-channel and repeated on the entire channel. Thus, the common SIG field 702 is the same on each sub-channel. In another example, the HE-SIG-A field may be modulated and transmitted on the entire channel.

The dedicated SIG field 704 may be transmitted to a particular user on each resource block. The dedicated SIG field 704 may be different on each sub-channel. The dedicated SIG field 704 may include a STA identity or a compressed version identity, which may indicate that the STA is assigned on that resource block. In the illustrated example, the HE-SIG-B field is the dedicated SIG field. The HE-SIG-B field transmitted on sub-channel 1 (CH1 in FIG. 7) may include a PAID or other type of STA identity of STA1. Similarly, the HE-SIG-B field transmitted on sub-channels 2 to 4 may include the PAIDs of STA2, STA3 and STA4. In an alternative example, a group ID may be used in the HE-SIG-B field transmitted on a sub-channel. Therefore, a group of STAs, instead of one STA mentioned in the above example, may be assigned for transmission on the sub-channel. The group of STAs may use some MU transmission schemes (e.g., MU-MIMO) to communicate with the AP on the assigned sub-channel. The group ID mentioned here may be the MU-MIMO group ID defined in IEEE 802.11ac or another type of group ID.

STAs may check the common SIG field 702 and notice that an MU transmission is followed. In the illustrated example, the STAs decode all of the dedicated SIG fields 704 (the HE-SIG-B field). If a STA's identity is carried in one or more dedicated SIG fields 704, the STA may continue the receiving procedure on the corresponding sub-channel(s). If the STA's identity is not presented on one or more of the dedicated SIG fields 704, it may not be the receiver of the MU transmission on the corresponding sub-channel(s). If the STA's identity is not presented on any of the dedicated SIG fields 704, it may not be the receiver of the MU transmission.

The AP may continue MU data transmission after the preamble. The resource allocation may follow that signaled in the dedicated SIG field 704. On a condition that the STA identity used in the dedicated SIG field 704 is not unique, the STAs may need to decode the MAC header and confirm that it is the receiver of the packet.

The MU mechanism described above may work in the case that the MU cluster schedule or arrangement (i.e., the MU clustering management) is transmitted in the same frame as the MU data. In some scenarios, the MU clustering management may be required to be transmitted before the MU data transmission.

Figure 8:
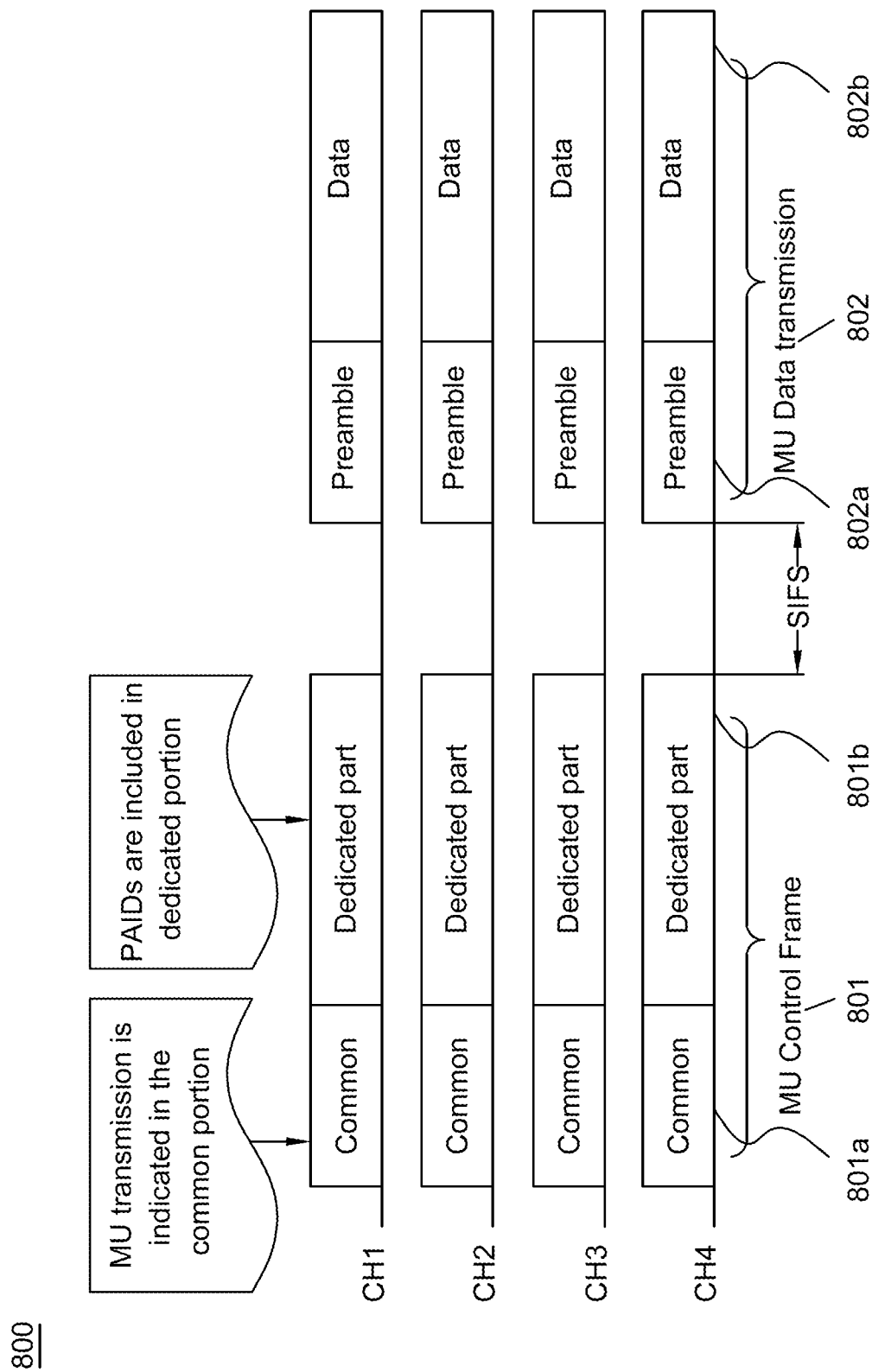
FIG. 8 is a diagram of an example alternative method of MU clustering where the MU clustering scheduling is transmitted in the MU control frame immediately preceding the MU data transmission.

FIG. 8 is a diagram of an alternative method of MU clustering where, for a MU transmission 800, the MU clustering scheduling is transmitted in the MU control frame 801 immediately preceding the MU data transmission 802, with a SIFS disposed therebetween. The MU data transmission 802 may be either a downlink transmission or an uplink transmission.

In the example illustrated in FIG. 8, the AP may acquire the media after CCA and backoff procedures. In the illustrated example, the AP acquires a channel with four sub-channels. The AP may begin an MU transmission 800, which may be a downlink MU transmission from the AP to multiple STAs or an uplink MU transmission from multiple STAs to the AP. The AP may transmit an MU control frame 801 to reserve the transmission opportunity (TXOP) and perform MU clustering scheduling. The MU control frame 801 may include a common part 801a and a dedicated part 801b. The common part 801a may reserve the media for a DL MU transmission, UL MU transmission or a combined DL/UL MU transmission. The dedicated part 801b may be different on each sub-channel. The AP may include a PAID or other kind of STA identity in the dedicated part on a certain sub-channel to implicitly indicate that the sub-channel is assigned to this STA.

In another example, a group ID may be used for a dedicated part 801b transmitted on a sub-channel. Thus, a group of STAs, instead of one STA, may be assigned for transmission on one sub-channel. The group of STAs may use some MU transmission schemes (e.g., MU-MIMO) to communicate with the AP on the assigned sub-channel. The group ID may be the MU-MIMO group ID defined in the IEEE 802.11ac standard or another type of group ID.

The STAs may decode the MU control frame 801. After decoding the common part, the STAs may notice the MU TXOP and may compare their PAIDs or other type of STA identities with the ones transmitted in the dedicated part 801a. If the STA's PAID is included in one or more dedicated parts 801a, the STA may be a member of the MU cluster. In one scenario, the STA may need to decode the MAC header of the MU control packet 801 to confirm it. The STA may prepare the transmission and/or reception on the corresponding sub-channels associated with the dedicated part 801a. Otherwise, the STA may not be part of the MU transmission, and it may set its NAV accordingly. A short inter-frame space (SIFS) time after the MU control frame 801, the MU data transmission 802 may follow, which includes a preamble 802a and data 802b. For a DL MU data transmission, the AP may transmit the data frames to multiple users on their assigned sub-channel(s). For a UL MU data transmission, the STAs may begin uplink transmission on their assigned sub-channel(s).

In an example, the MU control frame 801 may be replaced by any frame transmitted before the MU data transmission 802, which may include control, scheduling or management information for the MU data transmission 802. In the example illustrated in FIG. 8, a SIFS is used between the MU control frame 801 and the MU data frame 802. However, other possible inter-frame spacing may be used instead. Further, in the example illustrated in FIG. 8, the MU data transmission 802 follows the DL MU control frame 801. However, it may be possible that other control frames (either DL or UL) may be between the MU data transmission 802 and the DL MU control frame 801.

As described briefly above, multi-user transmissions may require additional control frames, which may be used for resource allocation, synchronization, and the like. These MU control frames may be considered as overhead to the entire system. Examples described below make use of null data packets (NDPs), which may include a PLCP header without the MAC body, to carry MU control messages and/or other MAC information. The examples described below include two high efficiency (HE) NDP MAC PPDU designs and detailed NDP MU MAC frames.

Examples are described below that make use of an HE NDP MAC PPDU. Two HE NDP MAC PPDU examples are described, and one of ordinary skill in the art will appreciate that other HE NDP MAC PPDU designs are possible within the scope of the described examples. In the first HE NDP MAC PPDU example, only one HE-NDP-SIG field is included in the HE NDP MAC PPDU, while in the second HE NDP MAC PPDU example, the NDP MAC PPDU carries both an HE-NDP-SIG-A field and an HE-NDP-SIG-B field.

With respect to the first HE NDP MAC PPDU example, in order to be backward compatible to other IEEE 802.11 standards, the HE NDP MAC PPDU may carry a legacy preamble portion.

FIG. 9 is a diagram of an example HE NDP MAC PPDU 900 according to the first HE NDP MAC PPDU example. As shown in one example in FIG. 9, legacy short training fields (STF), long training fields (LTF) and signal (SIG) fields may be included in the PPDU as a legacy preamble portion 901. If a system is required to be backward compatible to IEEE 802.11a/g, the non-HT-STF (L-STF), non-HT-LTF (L-LTF), and non-HT-SIG (L-SIG) fields may be the same as the legacy portion defined in IEEE 802.11n mixed mode. If a system is considered to be backward compatible to IEEE 802.11n, the L-STF, L-LTF, and L-SIG fields may be understandable by IEEE 802.11n and 802.11n+ devices. The legacy part may be designed in the same way as the HT portion in greenfield mode.

The legacy preamble portion 901 may be transmitted over the conventional basic channel bandwidth and duplicated with or without phase rotation on the entire channel. The basic channel bandwidth may be the smallest bandwidth that is mandatorily supported by the system. For example, when the system is operating on the 2.4 GHz band or the 5 GHz band, the basic channel bandwidth may be 20 MHz. If the AP is operating on an 80 MHz channel, then the legacy portion 901 may be transmitted on each 20 MHz channel and repeated on the remaining channels.

In the example illustrated in FIG. 9, an HE-NDP-SIG field 902 may follow the legacy preamble 901 and may use the same number of subcarriers as in the L-SIG field. The HE-NDP-SIG field 902 may be transmitted using the same antenna pattern (e.g., omni, sectional or beamformed antenna pattern) as that used for the L-LTF field.

Some MU transmissions may allow the AP to assign one or more sub-channels to one STA. A sub-channel may be the basic resource unit that the AP may use for resource allocation. On a condition that the sub-channel size of the MU transmission is the same as the basic channel bandwidth (e.g., the basic channel bandwidth is 20 MHz, the sub-channel bandwidth is also 20 MHz, and the AP is operating on a same or wider channel), the HE-NDP-SIG field 902 may be transmitted on each sub-channel and repeated on the entire band. On a condition that the sub-channel size of the MU transmission is less than the basic channel bandwidth (e.g., the basic channel bandwidth is 20 MHz, the sub-channel bandwidth is 5 MHz, and the AP is operating on a same or wider channel bandwidth), the HE-NDP-SIG field 902 may be transmitted on the basic channel bandwidth. Or in an alternative example, the HE-NDP-SIG field 902 may be transmitted on the sub-channel and repeated on the entire band.

The example illustrated in FIG. 9 includes two alternate formats for the HE-NDP-SIG field 902: Format A and Format B.

Format A is an HE-NDP-SIG field 902 with fixed default length (e.g., fixed in the unit of OFDM symbols). For example, if two OFDM symbols may be used for the HE-NDP-SIG field 902 and each OFDM symbol contains 48 data carriers, then two OFDM symbols may carry 48 information bits given binary phase shift keying (BPSK) and a rate 1/2 convolutional code. The format A HE-NDP-SIG field 902 illustrated in FIG. 9 includes an NDP MAC frame body 903, an NDP indication 904, a cyclic redundancy check (CRC) 905 and a tail 906. The NDP MAC frame body subfield 903 may be used to carry the main information of the control or management frame. The NDP indication subfield 904 may be used to indicate or identify that this is an NDP MAC frame and that this SIG field may not be the same as a normal data frame and may be re-written. In an alternative example, the NDP indication subfield 904 may be implicitly signaled using the L-STF, L-LTF, or L-SIG fields and may not be explicitly signaled in the HE-NDP-SIG field 902. For example, the length of the L-SIG field may be used to implicitly signal the NDP MAC field. If the length field in the L-SIG field is smaller than a given threshold, the frame may be considered as an NDP MAC frame. The tail subfield 906 may be presented when a zero-padding convolutional coding scheme is used for this NDP SIG field 902. With other coding schemes, or a convolutional coding scheme with a tail-biting technique, the tail subfield 906 may not be required. If, for example, the NDP SIG field 902 carries 48 information bits, the NDP MAC frame body field 903 may include 37 bits (e.g., 1 bit for NDP indication, 4 bits for CRC, and 6 bits for tail).

Format B is an HE-NDP-SIG field 902 with variable length. The Format B HE-NDP-SIG field illustrated in FIG. 9 includes an NDP MAC frame length subfield 907, an NDP MAC frame body 908, an NDP indication subfield 909, a CRC subfield 910 and a tail subfield 911. The NDP MAC frame length subfield 907 may be used to indicate the length of the NDP-SIG field 902. This length may be in the unit of OFDM symbols, bits or bytes. The NDP MAC frame body 908 may be used to carry the main information of the control or management frame. The NDP indication subfield 909 may be used to indicate that this is an NDP MAC frame and that this SIG field may not be the same as a normal data frame and may be re-written. As described above, the NDP indication subfield 909 may be implicitly signaled using the L-STF, L-LTF, or L-SIG fields and may not be explicitly signaled in the HE-NDP-SIG field 902. The tail subfield 911 may be presented when a zero-padding convolutional coding scheme is used for this NDP SIG field 902. With other coding schemes, or a convolutional coding scheme with a tail-biting technique, the tail subfield 911 may not be required. If, for example, the NDP SIG field 902 carries 48 information bits, the NDP MAC frame body field may contain 37 bits (e.g., 1 bit for NDP indication, 4 bits for CRC, and 6 bits for tail). For example, if N OFDM symbols may be used for the NDP MAC frame 900, then 24N information bits may be carried. The NDP MAC frame may include 24N-7-x-y bits (e.g., 1 bit for NDP indication, x bits for CRC, y bits for NDP MAC frame length and 6 bits for tail).

FIG. 10 is a diagram of an example HE NDP MAC PPDU 1000 according to the second example. With respect to the second HE NDP MAC PPDU example, the example HE NDP MAC PPDU includes a legacy preamble portion 1001, which includes L-STF, L-LTF and L-SIG fields. The transmission rule of this legacy preamble portion may be the same as that described above with respect to the first example. Followed by the legacy preamble portion, two NDP SIG fields 1002 and 1003 may be present.

The HE-NDP-SIG-A field 1002 may include common information to all of the users. This field may be transmitted over the basic channel bandwidth and repeated over the entire band. In one example, the AP may operate on a 20 MHz channel while the basic channel bandwidth may also be 20 MHz. The sub-channel size may be less than 20 MHz (e.g., 5 MHz). Then, the HE-NDP-SIG-A field 1002 may be transmitted over the 20 MHz channel. In another example, the AP may operate on an 80 MHz channel while the basic channel bandwidth may also be 20 MHz. The sub-channel size may be 20 MHz. Then, the HE-NDP-SIG-A field 1002 may be coded and modulated over the primary 20 MHz sub-channel and repeated over the remaining three sub-channels.

In the example illustrated in FIG. 10, the HE-NDP-SIG-A field 1002 includes an NDP MAC frame body 1004, an NDP indication subfield 1005, a CRC subfield 1006 and a tail subfield 1007. The NDP MAC frame body may be used to carry the common information of the control or management frame. The common information may be broadcast to all of the users. The NDP indication subfield 1005 may be used to indicate that this is an NDP MAC frame and this SIG field is not the same as a normal data frame and may be re-written. The NDP indication subfield 1005 may also be used to indicate the particular NDP MAC PPDU format (e.g., whether an HE-NDP-SIG-B field 1003 follows the HE-NDP-SIG-A field 1002 or is included in the NDP MAC frame). As described above, the NDP indication subfield 1005 may be implicitly signaled using the L-STF, L-LTF, or L-SIG fields and may not be explicitly signaled in the HE-NDP-SIG field 1002. The tail subfield 1007 may be presented when a zero-padding convolutional coding scheme is used for the NDP SIG field. With other coding schemes, or a convolutional coding scheme with a tail-biting technique, this field may not be required.

Further, the HE-NDP-SIG B field 1003 may carry a user/resource dedicated MAC frame body 1008. For a user dedicated HE-NDP-SIG-B field 1003, the HE-NDP-SIG-B field 1003 may be used to carry user-specified-signaling. With an MU-MIMO transmission scheme, the HE-NDP-SIG B field 1003 may be modulated with the user specified beams. With an OFDMA transmission scheme, the HE-NDP-SIG B field 1003 may be transmitted on the sub-channel(s) that are allocated to the user. For example, one user may be allocated two sub-channels, and the HE-NDP-SIG B field 1003 may be modulated using the two sub-channels. For a resource dedicated HE-NDP-SIG-B field 1003, the HE-NDP-SIG-B field 1003 may be used to carry resource-specified-signaling. The resource-specified-signaling may be required by the user who is allocated to the resource block. With an OFDMA transmission scheme, the HE-NDP-SIG B field 1003 may be transmitted on each sub-channel. If one user is allocated with more than one sub-channel, the HE-NDP-SIG B field 1003 may be transmitted on one sub-channel and repeated on the remaining assigned sub-channels.

In the example illustrated in FIG. 10, the HE-NDP-SIG-B field 1003 immediately follows the HE-NDP-SIG-A field

1002. In an alternative example, an HE-STF field and an HE-LTF field may be inserted between the HE-NDP-SIG-A field 1002 and the HE-NDP-SIG-B field 1003. The HE-STF and HE-LTF fields may be user/resource specific or may be transmitted over the entire bandwidth.

The HE-NDP-SIG-B field 1003 may use the basic modulation and coding scheme (MCS) (e.g., MCS0). In an alternative example, the HE-NDP-SIG-B field 1003 may be modulated by a selected MCS for all of the users. In this case, the selected MCS may be signaled in the HE-NDP-SIG-A field 1002. In another example, the HE-NDP-SIG-B 1003 field may be modulated by a user/resource-specific-MCS. Thus, different MCSs may be used for different users/resources. Those MCS values may be signaled in the HE-NDP-SIG-A field 1002.

The HE-NDP-SIG-B field 1003 may include a user/resource-dedicated-MAC-frame-body 1008, a CRC subfield 1009 and a tail subfield 1010. The user/resource-dedicated-MAC-frame-body 1008 may be used to carry the user/resource dedicated information of the control or management frame. The tail subfield 1010 may be presented when a zero-padding convolutional coding scheme is used for the NDP SIG field. With other coding schemes, or a convolutional coding scheme with a tail-biting technique, this field may not be required.

Several examples of NDP MAC frame bodies (e.g., to be applied to NDP MAC frame bodies 903, 908 and/or 1004) and/or user/resource dedicated MAC frame bodies (e.g., to be applied to the user/resource-dedicated-MAC-frame-body 1008) of HE MU control frames are described below.

For downlink MU transmissions, as illustrated, for example, in FIG. 3A, the involved MU control frames may include the MU-RTS frame and the MU-CTS frame. The MU RTS-frame may be used to reserve the media and schedule the downlink MU transmission. The MU-RTS frame may be transmitted by the AP to multiple STAs and may also be referred to, for example, as a G-RTS frame or an MU-Schedule frame. The MU-CTS frame may be transmitted by STAs to respond to the MU-RTS frame. The MU-CTS frame may be used to confirm the reception of an MU-RTS frame and may provide additional information about the STA to the AP. The M U-CTS frame may also be referred to, for example, as a G-RTS frame or a G-ACK frame.

For uplink MU transmissions, as illustrated, for example, in FIG. 3B, the involved MU control frames may include the MU Poll frame, the uplink response/request (ULR) frame, the MU schedule frame and the MU ACK frame. The MU Poll frame may be used by the AP to reserve the media and poll multiple STAs for uplink transmission. Normally, an AP may transmit the MU Poll frame to multiple STAs. This MU Poll frame may also be referred to, for example, as a G-Poll frame or an MU-Request frame. The ULR frame may be used by STAs to respond to the Poll frame or to request a grant of an uplink transmission (in which case the ULR frame may or may not be a responding frame to an MU Poll). Normally, the ULR frame may be transmitted from STAs to an AP. If multiple STAs transmit their ULR frames simultaneously, the transmission may be distinguished in spatial, time, frequency or code domains. The ULR frame may also be referred to, for example, as an MU-Request frame, an MU-Response frame, or an MU-RTS frame. The MU schedule frame may be used by the AP to schedule the uplink transmissions and/or synchronize the uplink transmission, and may also be referred to as a MU UL schedule frame. The MU schedule frame may be referred to by other names and may be considered as a responding frame to the ULR frame.

Normally, an MU schedule frame may be transmitted from an AP to multiple STAs. The MU ACK frame may be used by the AP to acknowledge reception of the previous uplink transmissions.

Examples of an HE NDP MU-RTS frame body are described below. An NDP MU-RTS frame may be used by the AP to reserve an MU TXOP and schedule a DL MU transmission. Three examples of an HE NDP MU-RTS frame body are described, and one of ordinary skill in the art will appreciate that other HE NDP MU-RTS frame designs are possible within the scope of the described examples.

With respect to a first example of an HE NDP MU-RTS frame body, the HE NDP MU-RTS frame body may be included in a SIG field of an NDP MAC PPDU, which may use the structure given in the HE NDP MAC PPDU example of FIG. 9 described above.

Figure 11:
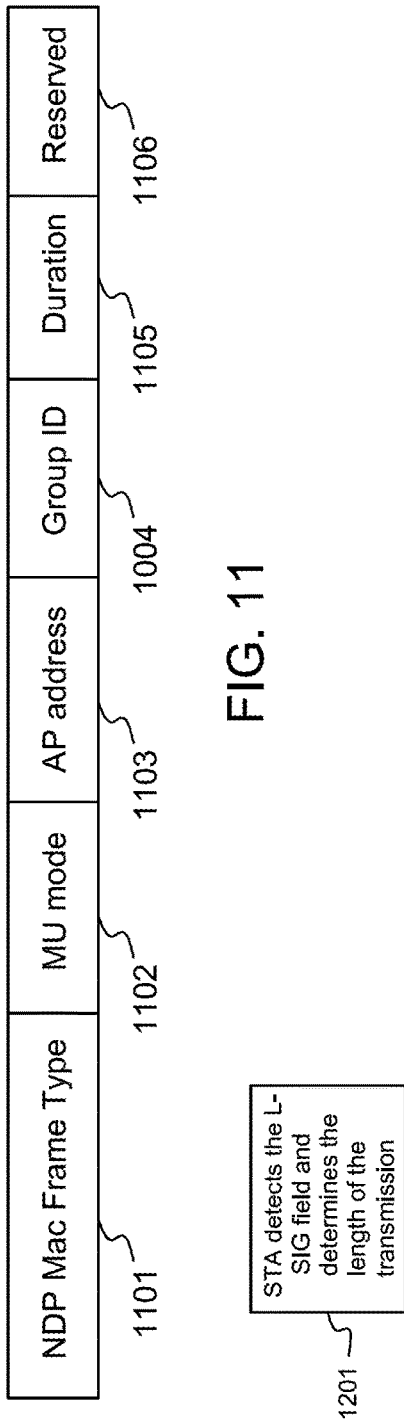
FIG. 11 is a diagram of a first example embodiment of an HE NDP multi-user-request-to-send (MU-RTS) frame.

FIG. 11 is a diagram of the first example of an HE NDP MU-RTS frame. In the example illustrated in FIG. 11, the NDP MU-RTS MAC frame body field 1100 includes an NDP MAC Frame Type subfield, an MU mode subfield, an AP address/TA subfield, a Group ID subfield, a duration subfield and a reserved subfield.

The NDP MAC Frame Type subfield may be used to indicate that the NDP MAC frame is a HE NDP MU-RTS frame such that devices disclosed herein can identify the frame as a HE NDP MU-RTS frame. The number of bits used for this subfield may depend on how many NDP MAC frames are defined. When an MU mode subfield is also included, less bits may be needed. Further, the NDP MAC Frame Type subfield may be used to implicitly signal the DL/UL direction of the frame by defining DL and UL MAC frame types. Or in an alternative example, a direction subfield may be explicitly included in the frame body field 1100.

The MU mode subfield may be used to indicate the MU transmission mode (e.g., MU-MIMO, OFDMA, single user (SU) or time domain multi-user aggregation). In an alternative example, this subfield may be combined with the NDP MAC Frame Type subfield.

The AP address/TA subfield may be used to signal the transmitter address. When the MU-RTS frame is transmitted by the AP, it may be used to signal the AP address.

The Group ID subfield may be transmitted from the AP to multiple STAs and may be used to signal the group ID of the STAs.

The Duration subfield may be used to signal the duration of the TXOP. Unintended STAs may use this subfield to set their network allocation vector (NAV).

The Reserved sub-field may be reserved for future use.

Figure 12:
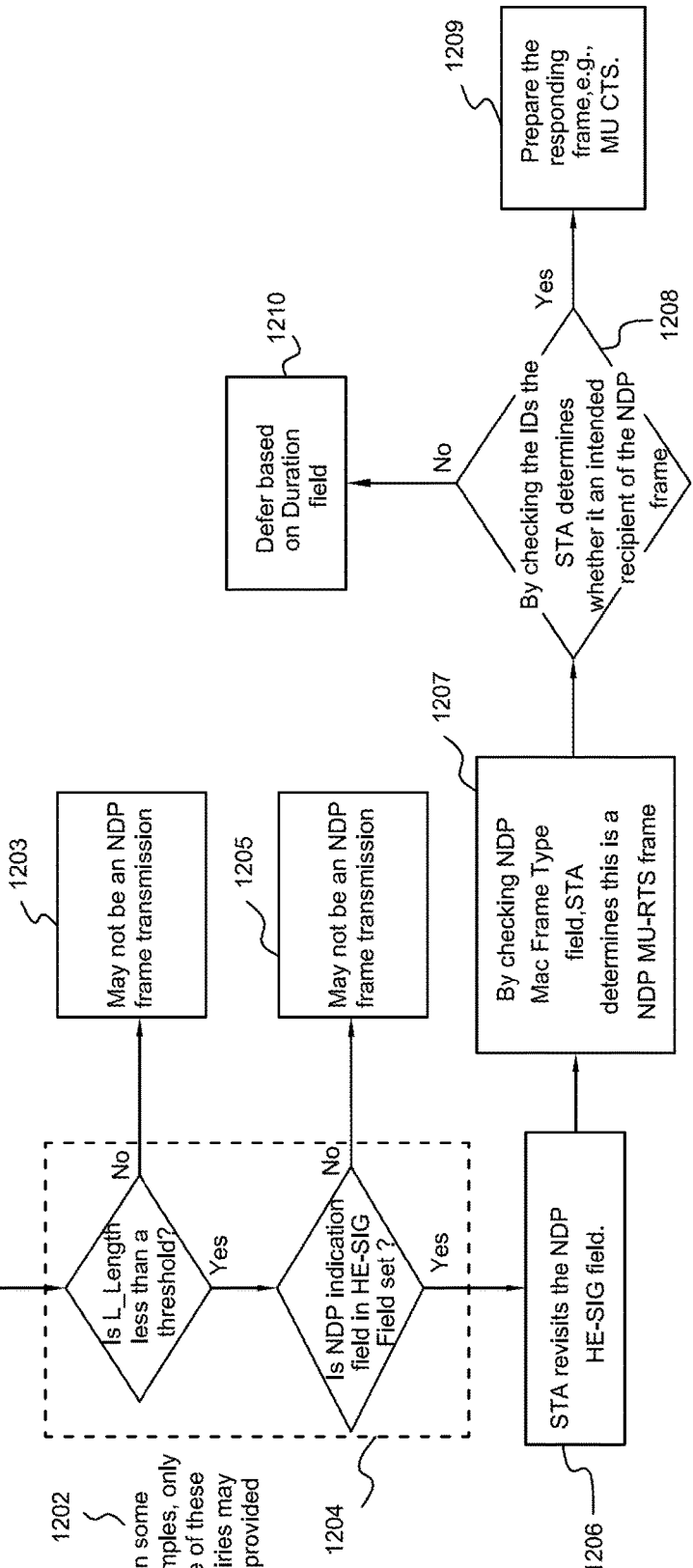
FIG. 12 is a flow diagram of example high-efficiency multi-user (HE MU) procedures using the example NDP MU control frame of FIG. 11.

The AP may prepare and transmit an HE NDP MU-RTS frame after it acquires the media and has traffic for multiple users. FIG. 12 illustrates a flow diagram of example HE MU procedures using the example NDP MU control frame of FIG. 11. In operation 1201, one or more STAs may receive a packet and perform start of packet detection using L-STF and L-LTF fields. By decoding the L-SIG field, the STA may determine the length of this transmission. Based on the length of the transmission determined from the L-SIG field, the STA determines whether the length of the transmission is less than a threshold by a threshold test, comparison or the like (1202). If the length of the transmission is not less than the threshold, the STA may determine that the frame is not a NDP frame (1203). On the other hand, if the length of the transmission is less than the threshold, the STA may determine that the frame is or may be a NDP frame and may proceed to operation 1204 or 1206 for further verification. The STA may continue decoding the HE-NDP-SIG field and may determine that this is an NDP MAC frame when the NDP indication field is set to 1 (1204). If the NDP indication field is not set, the STA may determine that the frame is not a NDP frame (1205). If the STA determines that the NDP indication field is set, the STA my determine that the frame is or may be a NDP frame and may proceed to operation 1206 for further processing of the NDP MU control frame. It will be appreciated that only one of operations 1202 and 1204 may be provided for determining whether the frame is a NDP frame.

The STA may revisit the NDP MAC frame body subfield (1206) (e.g., the NDP MAC Frame body subfield 1100). Here, the STA checks the NDP MAC frame type and MU mode fields which may identify or indicate the MU-RTS frame and the MU transmission mode (1207) such that the STA can determine the same. In addition, the STA may check the AP address, Group ID, and/or Cluster ID field (not shown), and may determine whether the STA is an intended receiver of the MU transmission (1208). If the STA is associated with the AP, and the group ID is the same as that transmitted in the frame, the STA may be considered to be one of the intended receivers and proceed to operation 1209.

For example, an AP may be associated with many STAs (e.g., 100 STAs). The AP may include its signature (e.g., its AP address) in the SIG field. All of the 100 associated STAs may notice that a transmission is from their associated AP based on analyzing the AP address. Based on analyzing the AP addresses and confirming that the STA is an associated STA, the associated STAs may continue read the packet. Unassociated STAs may by drop the packet and defer for a duration. The AP may further decide to perform a MU transmission to a group or subset of STAs which are associated with it (e.g., 8 STAs). The information that a STA is an intended receiver may be included in the group ID and/or cluster ID. The 8 STAs here are may be referred to as intended recipient/receiver or intended STAs. Therefore, in order to determine whether a STA is an intended STA, the STA may check the AP address, if not previously performed, and check at least one of the group ID and cluster ID provided in the SIG field.

In operation 1209 the STA may begin preparing a responding frame, e.g., an MU-CTS frame transmission, to be transmitted after a SIFS time following the end of the MU-RTS transmission. Otherwise, the STA may determine it is not part of the transmission, and it may check the duration field and set up NAV accordingly (1210).

With respect to a second example of a HE NDP MU-RTS frame body, the HE NDP MU-RTS frame body may be included in a SIG field of an NDP MAC PPDU, which may use the structure given in the first example HE NDP MAC PPDU shown in FIG. 9.

Figures 13, 14:
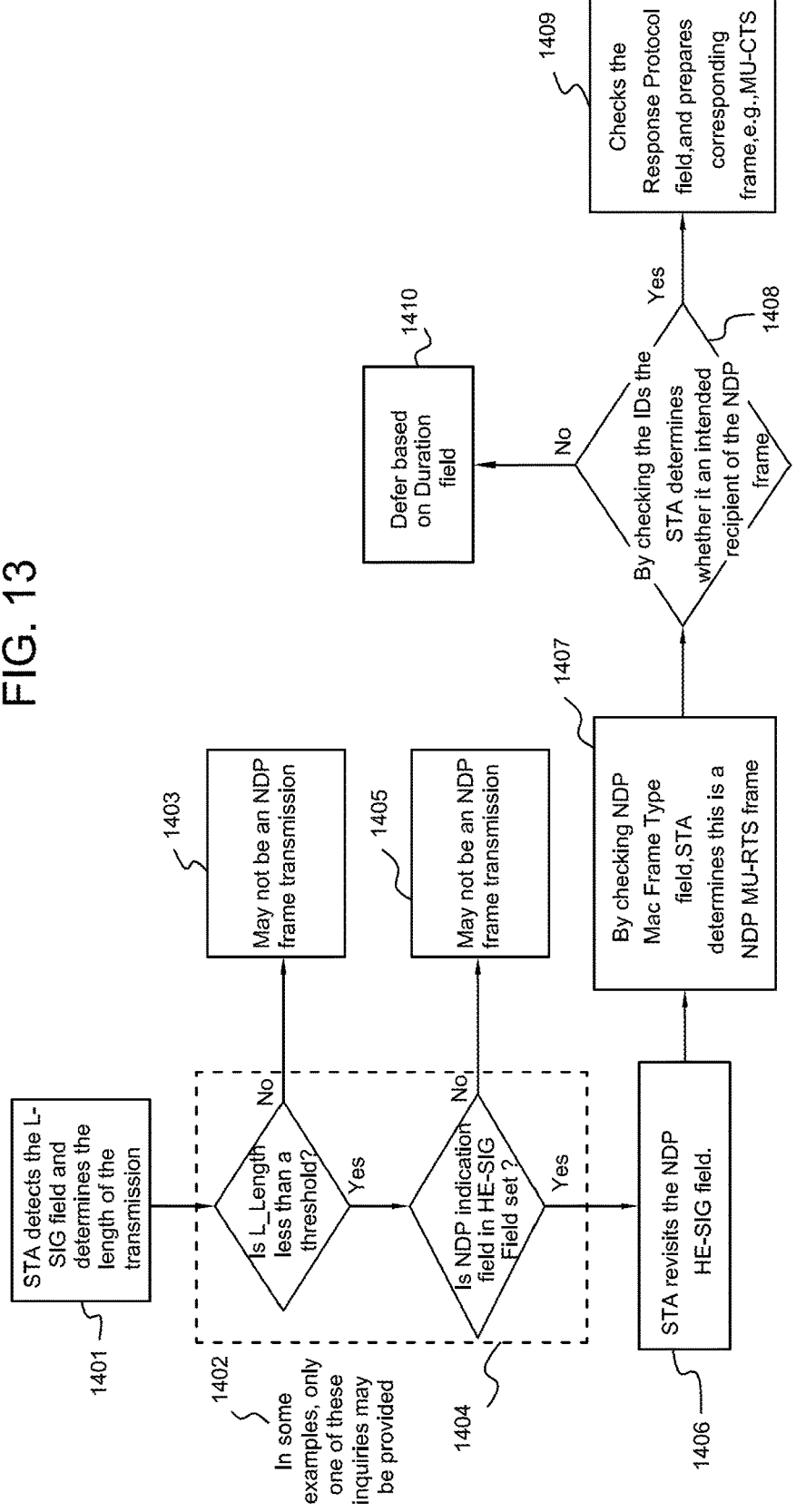
FIG. 13 is a diagram of a second example embodiment of an HE NDP MU-RTS frame.
FIG. 14 is a flow diagram of example HE MU procedures using the example NDP MU control frame of FIG. 13.

FIG. 13 is a diagram of a second example of an HE NDP MU-RTS frame 1300. In the example illustrated in FIG. 13, most of the subfields are similar to the first example shown in FIG. 11. However, the subfields may use a different number of bits and may include an additional subfield, the response protocol subfield. The response protocol subfield may be used to indicate one or more of the following: a format of the response frame (e.g., whether the replying frame is an NDP frame or a normal frame with a MAC body), whether sub-channel-selection-related-information is required in the response frame, whether synchronization information is required in the response frame and whether the multiple desired receivers transmit the response frames simultaneously in the frequency, time, and code domains.

Sub-channel-selection-related-information may include, for example, the rank or order of the sub-channels, the measurement (such as the signal-to-interference-plus-noise ratio (SINR) or a received signal strength indicator (RSSI) on each sub-channel) or the best and/or worst sub-channel(s). Synchronization information may include, for example, the transmit power, link margin, timestamp compressed timestamp, or carrier frequency offset. Simultaneous transmission in the frequency domain may mean that the STAs transmit response frames on their assigned sub-channels, which may not overlap with each other. Simultaneous transmission in the time domain may mean that the STAs transmit response frames on different time slots. The AP may or may not poll them before each uplink transmission. Simultaneous transmission in the code domain may mean that the STAs use the same time-frequency resource to transmit the response frames. However, they may use pre-defined orthogonal sequences such that the AP may distinguish them at the receiver.

FIG. 14 illustrates a flow diagram of example HE MU procedures using the example NDP MU control frame of FIG. 13. Operations 1401-1410 are similar to operations 1201-1210 in FIG. 12, respectively, except in operation 1409 the STA may additionally check the response protocol field for preparing a responding frame, e.g., an MU-CTS frame transmission. For example, in operation 1401, One or more STAs may receive a packet and perform start of packet detection using L-STF and L-LTF fields. By decoding the L-SIG field, the STA may determine the length of this transmission. Based on the length of the transmission determined from the L-SIG field, the STA determines whether the length of the transmission is less than a threshold by a threshold test, comparison or the like (1402). If the length of the transmission is not less than the threshold, the STA may determine that the frame is not a NDP frame (1403). On the other hand, if the length of the transmission is less than the threshold, the STA may determine that the frame is or may be a NDP frame and may proceed to operation 1404 or 1406 for further verification. The STA may continue decoding the HE-NDP-SIG field and may determine that this is an NDP MAC frame when the NDP indication field is set to 1 (1404). If the NDP indication field is not set, the STA may determine that the frame is not a NDP frame (1405). If the STA determines that the NDP indication field is set, the STA my determine that the frame is or may be a NDP frame and may proceed to operation 1406 for further processing of the NDP MU control frame. It will be appreciated that only one of operations 1402 and 1404 may be provided for determining whether the frame is a NDP MAC frame according to the conditions (i.e., NDP condition) therein.

The STA may revisit the NDP MAC frame body subfield (1406) (e.g., the NDP MAC Frame body subfield 1300). Here, the STA checks the NDP MAC frame type and MU mode fields which may identify or indicate the MU-RTS frame and the MU transmission mode (1407) such that the STA can determine the same. In addition, the STA may check the AP address, Group ID, and/or Cluster ID field (not shown), and may determine whether the STA is an intended receiver of the MU transmission (1408). If the STA is associated with the AP, and the group ID is the same as that transmitted in the frame, the STA may be considered to be one of the intended receivers and proceed to operation 1409. In operation 1409 the STA may check the Response Protocol field and may prepare sub-channel selection and synchronization information accordingly. In operation 1409 the STA may begin preparing a responding frame, e.g., an MU-CTS frame transmission, to be transmitted after a SIFS time following the end of the MU-RTS transmission. The transmission scheme of the MU-CTS frame (e.g., whether the multiple users transmit the MU-CTS frame simultaneously or sequentially, whether it is an NDP frame or a full MAC frame, etc.) may follow the indication of the Response Protocol field as well. Otherwise, the STA may determine it is not part of the transmission, and it may check the duration field and set up NAV accordingly (1410).

Figure 15:
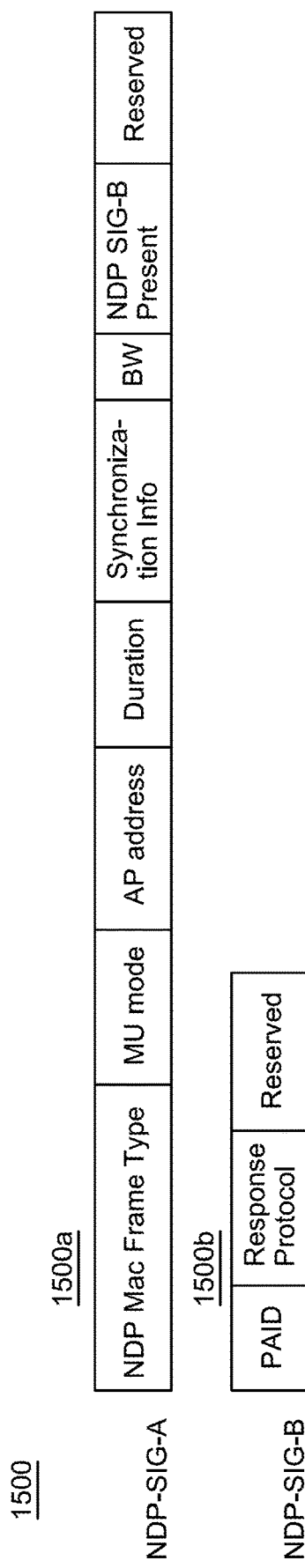
FIG. 15 is a diagram of a third example embodiment of an HE NDP MU-RTS frame.

With respect to a third example of an HE NDP MU-RTS frame body, this NDP frame body shown in FIG. 15 may be included in a SIG field of an NDP MAC PPDU, which may use the structure given in the second HE NDP MAC PPDU example as shown in FIG. 10, where NDP-SIG-A and NDP-SIG-B fields may be used.

FIG. 15 is a diagram of the third example of an HE NDP MU-RTS frame 1500. In the example illustrated in FIG. 15, the NDP frame body 1500a contained in the NDP-SIG-A field (e.g., NDP-SIG-A field 1002) may include an NDP Mac Frame Type subfield, an MU mode subfield, an AP address/TA subfield, a duration subfield, a synchronization info subfield, a bandwidth (BW) subfield, an NDP-SIG-B present subfield and a reserved subfield.

The NDP MAC Frame Type subfield may be used to indicate or identify the frame as a HE NDP MU-RTS frame to the STA. The MU mode subfield may be used to indicate or identify the MU transmission mode (e.g., MU-MIMO, OFDMA, SU or time domain multi-user aggregation) to the STA. In an alternative example, this mode may be combined with the NDP MAC Frame Type subfield. The AP address/TA subfield may be used to signal or provide the transmitter address. When the MU-RTS frame is transmitted by the AP, the AP address/TA subfield may be used to signal or provide the AP address to the STA. The Duration subfield may be used to signal or provide the duration of the TXOP to the STA. Unintended STAs may use this subfield to set NAV.

The Synchronization Info subfield may include time/frequency/power-synchronization-related-information transmitted from the AP to the STAs, or the AP may use this subfield to require the STAs to respond with required time/frequency/power-synchronization-related-information. This subfield may be included in the NDP-SIG-A field (as illustrated in FIG. 15), and the synchronization info may be shared with all the STAs/users. In an alternative example, this subfield may be included in the NDP-SIG-B field (e.g., NDP-SIG-B field 1003), and the subfield may include user specific/STA-dedicated-synchronization-information. The BW subfield may be used to indicate bandwidth, which may be one or more of an operation bandwidth of the AP, an acquired bandwidth in the TXOP, or the sub-channel bandwidth (e.g., where the basic sub-channel size may be varied per transmission). As an example of the bandwidth being acquired in the TXOP, an AP that operates on 80 MHz may only acquire 60 MHz sub-channels, so the acquired bandwidth may be 60 MHz. The NDP-SIG-B present subfield may be used to signal whether the NDP-SIG-B field (e.g., NDP-SIG-B field 1003) follows the NDP-SIG-A field (e.g., NDP-SIG-A field 1002) such the STA is aware to check the NDP-SIG-B field. The Reserved subfield may be reserved for future use.

The user/resource dedicated MAC frame body 1500b contained in the HE-NDP-SIG-B field (e.g., NDP-SIG-B field 1003) may include one or more of a PAID or a response protocol subfield. The PAID subfield may include a partial AID or other possible ID that may be used to represent the STA. In an example, the NDP-SIG-B field may be resource/user-dedicated, and, therefore, the PAID subfield may be used to implicitly signal the resource allocation. For example, the NDP-SIG-B field transmitted on sub-channels k and n may carry the same PAID. Then, the user indicated by the PAID may be allocated to sub-channels k and n. The response protocol subfield may be included in the NDP-SIG-B field, and this subfield may include a user/STA-dedicated response protocol. In an alternative example, the response protocol subfield may be included in the NDP-SIG-A field, and the response protocol may be shared with all the STAs/users.

The response protocol subfield may be used to indicate and/or identify one or more of the following: a format of the response frame, whether sub-channel-selection-related-information is included in the response frame, or whether the multiple desired receivers transmit the response frames simultaneously in the frequency, time, or code domains. The format of the response frame may indicate, for example, whether the replying frame is an NDP frame or a normal frame with a MAC body. The response protocol subfield may also be used to signal that a DL MU transmission may follow the frame with xFIS separation. In this way, no response frame may be required. With respect to whether sub-channel-selection-related-information is included in the response frame, sub-channel-selection-related-information may include, for example, the rank or order of the sub-channels, the measurement (e.g., signal-to-interference-plus-noise ratio (SINR) or received signal strength indicator (RSSI) on each sub-channel), or the best and/or worst sub-channel(s).

Figure 16:
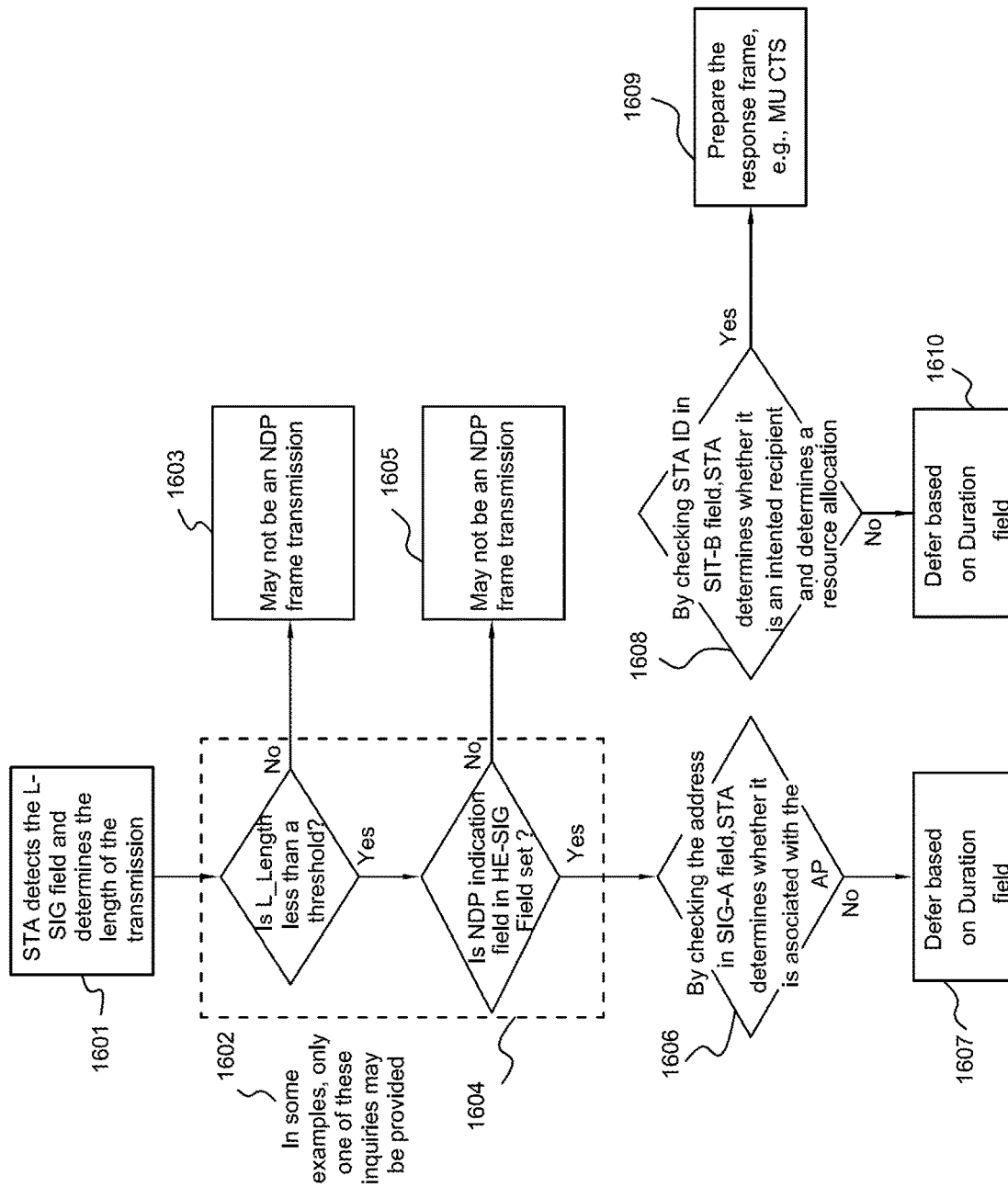
FIG. 16 is a flow diagram of example HE MU procedures using the example NDP MU control frame of FIG. 15.

FIG. 16 illustrates a flow diagram of example HE MU procedures using the example NDP MU control frame of FIG. 15. Operations 1601-1605 and 1609 are similar to operations 1201-1205 and 1209 in FIG. 12, respectively. The AP may prepare and transmit the HE NDP MU-RTS frame after it acquires the media and has traffic for multiple users, and STAs may receive this packet begin packet detection using L-STF and L-LTF fields. By decoding the L-SIG field, a STA may determine the length of this transmission and determine whether the frame is a NDP MAC frame therefrom. The STA may continue decoding the HE-NDP-SIG-A field and may determine that this is an NDP MAC frame when the NDP indication field is set to 1. The STA may determine that a NDP-SIG-B field may follow when the NDP SIG-B Present field is 1 in the NDP-SIG-A field. After confirming that the frame is an NDP frame, the STA may check the NDP MAC frame type subfield to determine the type of frame. In operation 1606, the STA may check the AP address in the NDP-SIG-A field and determine whether it is the associated AP. The STAs that are associated with this AP may continue checking the NDP-SIG-B field. The STAs that are associated with this AP may first check in operation 1606 whether the NDP SIG-B Present field is set in the NDP-SIG-A field to determine whether a NDP-SIG-B field follows the NDP-SIG-A field, if the STA hasn't performed this check previously. The STAs that are not associated with this AP may check the duration field and set their NAV accordingly (1607). The STA may also check the BW field to determine the operating sub-channels for the MU transmission. These operating sub-channels may be the sub-channels the AP acquired for transmission and may be the same as or less than the total operation bandwidth announced by the AP. In this way, the OBSS STA may set NAV on the utilized sub-channels and may be allowed to use the unused sub-channel(s) when they became available.

The STA associated with the AP may continue detecting and processing the NDP-SIG-B field. Since NDP-SIG-B fields transmitted on different sub-channels may be different, the STA may need to decode all the NDP-SIG-B fields transmitted on all of the sub-channels. By checking the PAID field (or other possible identities) on each sub-channel in operation 1608, the STA may determine whether it is a STA assigned to that sub-channel (i.e., the STA determines whether it is an intended recipient of the MU-transmission and its resource allocation based on, e.g., the PAID). A STA may be assigned to multiple sub-channels. Thus, the STA may need to decode SIG-B fields on all of the sub-channels.

The STA that are assigned to one or some sub-channels may proceed to operation 1609 to prepare the responding frames based on the information carried in both the NDP-SIG-A and NDP-SIG-B fields. The STA that are not assigned any sub-channel may proceed to operation 1610 and set a NAV according to the duration field.

Examples of an HE NDP MU-CTS frame body are described below. An NDP MU-CTS frame may be used by the STA to respond to an MU-RTS frame and confirm that the STA is ready for DL MU transmission. The HE NDP MU-CTS frame body may be included in a SIG field of an NDP MAC PPDU and may use the structure given in the HE NDP MAC PPDU shown in FIG. 9 described above.

FIG. 17 is a diagram of an example embodiment of an HE NDP MU-CTS frame body 1700. In the example illustrated in FIG. 17, the NDP MU-CTS MAC frame body field 1700 includes an NDP MAC Frame Type subfield, an MU mode subfield, a PAID/TA subfield, a Sub-Channel information subfield, a sync info field, a Duration subfield and a Reserved subfield.

The NDP MAC Frame Type subfield may be used to indicate and/or identify the frame as the HE NDP MU-CTS frame. The MU mode subfield may be used to indicate or identify the MU transmission mode (e.g., MU-MIMO, OFDMA, SU or time domain multi-user aggregation). In an alternative example, the MU mode subfield may be combined with the NDP MAC Frame Type subfield. The PAID/TA subfield may be used to signal or provide the transmitter address. When the MU-CTS frame is transmitted by a STA, the PAID/TA subfield may be used to signal or provide the STA address or partial address.

The Sub-Channel information subfield may be used by the STA to indicate preferred sub-channel(s). For example, the STA may provide the order or rank of sub-channels according to the received signal strength, or the STA may provide the received signal measurements, such as SINR or RSSI of each sub-channel. In an alternative example, the STA may provide the index of the best sub-channel(s) and/or the index of the worst sub-channel(s). Synchronization Info subfield may include time/frequency/power-synchronization-related-information. The Duration subfield may be used to signal or provide the duration of the TXOP. Unintended STAs may use the Duration subfield to set their NAV. The Reserved subfield may be reserved for future use.

FIG. 18 illustrates a flow diagram of example HE MU procedures using the example NDP MU control frame of FIG. 17. In operation 1801, the STA prepares the NDP MU-CTS MAC frame in response to a NDP MU-RTS MAC frame. During the preparation of the MU-CTS frame, the STA indicates NDP MU-CTS frame in NDP Mac Frame Type field (1802), the STA includes the transmitter ID in the PAID/TA field (1803), the STA indicates preferred sub-channel in the Sub-Channel Info field (1804) and STA updates the TXOP duration field (1805). The STA may also provide synchronization information in the sync info field (not shown).

The STAs that are the destination of the MU-RTS frame may transmit an MU-CTS frame after a SIFS time following the end of MU-RTS reception. The MU-CTS frame may use the NDP format illustrated in FIG. 17.

According to the Response Protocol field defined in the MU-RTS frame or pre-defined in the standard, if nothing is shown in the previous MU-RTS frame, the transmission of the NDP MU-CTS may use one or more of the following: time domain division (TDD), frequency domain division (FDD), code domain division, or spatial domain division.

With respect to TDD, the STAs may transmit the NDP MU-CTS frames sequentially with or without SIFS separation in between. The order of transmission may be implicitly signaled by the sub-channel assignment or the position array in the group ID. In an alternative example, the NDP MU-CTS frame transmitted from a first STA may be transmitted after a SIFS time following the NDP MU-RTS frame. Then, the AP may transmit an NDP frame to poll the next STA. The second STA may transmit the NDP MU-CTS frame when it receives the NDP poll frame. Similar procedures may be followed for the rest of the transmission of NDP MU-CTS frames from the remaining STAs.

With respect to FDD, the STAs may transmit the NDP MU-CTS frames simultaneously but on different frequency sub-channels. The STAs may transmit the NDP MU-CTS frame on their assigned sub-channel(s). Or the STAs may transmit on sub-channels by using some mapping function. The mapping function may map a STA to a sub-channel and may be derived by the sub-channel/resource assignment or position bit field/array defined in the Group ID or cluster ID.

With respect to code domain division, the STA may transmit the NDP MU-CTS frames simultaneously on the same frequency band and may use their pre-assigned sequence to modulate the NDP MU-CTS frame. In an alternative example, the L-STF, L-LTF, and L-SIG fields from all of the STA may be the same, and the NDP-SIG field may be modulated by the STA-specific sequence. With respect to spatial domain division, the STA may transmit the NDP MU-CTS frames using an uplink MU-MIMO scheme.

The AP may detect all the NDP MU-CTS frames and may re-assign sub-channels to the STAs according to the collected sub-channel information field. The AP may prepare the synchronization related signaling according to the synchronization information field and may prepare the downlink schedule frame (which may also be an NDP frame), which may or may not include the sub-channel assignment and synchronization information. Or, in an alternative example, the AP may prepare the downlink MU transmission directly, and, in the PLCP header, the AP may reassign the sub-channel and provide synchronization information. Non-desired STAs may receive this packet and may update or set their NAV accordingly.

Examples of an NDP MU-Poll frame body are described below. An NDP MU-Poll frame may be used by the AP to reserve an MU TXOP and, in an example, to schedule a UL MU transmission. Four examples of an NDP MU-Poll frame body are described, and one of ordinary skill in the art will appreciate that other NDP Mu-Poll frame body designs are possible within the scope of the described examples.

With respect to a first example of a NDP MU-Poll frame body, the frame body may be included in a SIG field of an NDP MAC PPDU, which may use the structure given in the first example embodiment of the HE NDP MAC PPDU.

FIG. 19 is a diagram of the first one of the example NDP MU-Poll frame body embodiments. In the example illustrated in FIG. 19, the NDP MU-Poll MAC frame body field 1900 may include an NDP MAC Frame Type subfield, an MU mode subfield, an AP address/TA subfield, a Group ID/Multicast PAID subfield, a Duration subfield and a Reserved subfield.

The NDP MAC Frame Type subfield may be used to indicate and/or identify that this is an HE NDP MU-Poll frame. The MU mode subfield may be used to indicate and/or identify the MU transmission mode (e.g., MU-MIMO, OFDMA, SU or time domain multi-user aggregation). In an alternative example, the MU mode subfield may be combined with the NDP MAC Frame Type subfield. The AP address/TA subfield may be used to signal or provide the transmitter address. When the MU-Poll frame is transmitted by the AP, it may be used to signal or provide the AP address. The Group ID/Multicast PAID subfield may be transmitted from the AP to multiple STAs and may be used to signal the group ID of the STAs. In an alternative example, the Group ID/Multicast PAID subfield may be used to carry a multicast partial AID, which may include more STAs than typical MU transmissions. In this case, some polled STAs may not be allocated a time slot in the following UL MU transmissions. The Duration subfield may be used to signal the duration of the TXOP. Unintended STAs may use this subfield to set NAV. The Reserved subfield may be reserved for future use.

FIG. 20 illustrates a flow diagram of example HE MU procedures using the example NDP MU control frame of FIG. 19. Operations 2001-2010 are similar to operations 1201-1210 in FIG. 12, respectively, with a few differences. For example, in operation 2007, the STA checks the NDP MAC frame type field and determines the frame type to be a NDP MU-Poll frame. In addition, in operation 2009, the STA may, after determining it is an intended recipient of the NDP MU-Poll frame in operation 2008, prepare an UL transmission if the STA has traffic in its buffer.

The process shown in FIG. 20 is briefly described. The AP may prepare and transmit the HE NDP MU-Poll frame after it acquires the media and has traffic for multiple users. STAs may receive this packet and begin packet detection using the L-STF and L-LTF fields. By decoding the L-SIG field, a STA may determine the length of this transmission (2001) and determine whether the frame is a NDP frame based on a threshold test (2002). STA may continue decoding the HE-NDP-SIG field and may determine that the received frame is an NDP MAC frame when the NDP indication field is set to 1 (2004).

The STA may revisit the NDP Mac Frame body subfield (2006). Here, the NDP Mac Frame Type and MU mode fields may indicate the MU-Poll frame and the MU transmission mode (2007). By checking the AP address and Group ID/Multicast field, the STA may determine whether it is the intended recipient of the MU transmission (2008). If the STA is associated with the AP, and the group ID is the same as that transmitted in the frame, the STA may be considered as one of the intended receivers. The STA may check its uplink traffic buffer and, if data for transmission exists, begin preparing an NDP ULR frame transmission to be transmitted after a SIFS time following the end of the MU-RTS transmission. Otherwise, the STA may determine it is not part of the transmission, and it may check the duration field and set up NAV accordingly.

With respect to a second example of a NDP MU-Poll frame body, the frame body may be included in a SIG field of an NDP MAC PPDU, which may use the structure given in the HE NDP MAC PPDU shown in FIG. 9.

FIG. 21 is a diagram of the second example NDP MU-Poll frame body 2100. In the example illustrated in FIG. 21, most of the subfields are similar to the example illustrated in FIG. 19. However, the subfields may use a different number of bits. One additional subfield, the ULR subfield, may also be included, which may be used to control a following ULR frame. The ULR protocol subfield may include one or more of the following: a format of the response frame (e.g., whether the replying frame is an NDP frame or a normal frame with a MAC body), whether sub-channel-selection-related-information is required in the response frame, whether synchronization information is required in the response frame, whether an uplink sounding frame or training sequence is required with the ULR frame, whether link-adaptation-related-information is required in the ULR frame, or whether the multiple desired receivers transmit the response frame simultaneously in the frequency, time and code domains.

Sub-channel-selection-related-information may include, for example, the rank or order of the sub-channels, the measurement (e.g., SINR or RSSI on each sub-channel), or the best and/or worst sub-channel(s). Synchronization information may include, for example, the transmit power, link margin, timestamp or compressed timestamp, or carrier frequency offset. With respect to whether an uplink sounding frame or training sequence is required with the ULR frame, this may allow the AP to sound the channel of the STAs, and, thus, to schedule the uplink MU transmissions accordingly. If multiple sounding frames are allowed, this sub-field may be used to indicate a specific sounding frame format. Information about whether the link adaptation related information is required in the ULR frame may be used by the AP to assign MCS for the coming uplink MU transmissions. The design allows the AP to assign MCS for STAs.

Simultaneous transmission in the frequency domain may mean that the STAs transmit response frames on their assigned sub-channels, which may not overlap with each other. Simultaneous transmission in the time domain may mean that the STAs transmit response frames on different time slots. The AP may or may not poll them before each uplink transmission. Simultaneous transmission in the code domain may mean that the STAs use the same time-frequency resource to transmit the response frames. However, they may use pre-defined orthogonal sequences such that the AP may distinguish them at the receiver.

FIG. 22 illustrates a flow diagram of example HE MU procedures using the example NDP MU control frame of FIG. 21. Operations 2201-2210 are similar to operations 2001-2010 in FIG. 20, respectively, except in operation 2209 the STA may additionally check the ULR protocol field for preparing corresponding information according thereto. The AP may prepare and transmit the HE NDP MU-Poll frame after it acquires the media and has traffic for multiple users, and STA may receive this packet and begin packet detection using the L-STF and L-LTF fields in accordance with FIG. 22.

With respect to a third example NDP MU-Poll frame body, the frame body may be included in a SIG field of an NDP MAC PPDU, which may use the structure given in the HE MAC PPDU shown in FIG. 9.

FIG. 23 is a diagram of the third example of a NDP MU-Poll frame body 2300. In the example illustrated in FIG. 23, the NDP MU-RTS frame body 2300 may allow the AP to poll any of the users such that the intended user of this frame may not be restricted by a group ID or a multicast ID. Any STA that has uplink traffic that it intends to transmit via uplink MU transmissions may reply with a ULR frame upon reception of this frame. In this example, most of the subfields are similar to the example shown in FIG. 19, but the subfields may use a different number of bits. Further, in this example, the Group ID/Multicast PAID subfield may not be included and a Contention ULR allowed subfield may be provided, which may be used to indicate whether contention-based-ULR-transmissions are allowed and, in an example, the type of contention-based-ULR-transmissions permitted. For example, the ULR may be transmitted simultaneously using different orthogonal sequences after an SIFS time later following this frame. Or the AP may reserve a particular time slot for the STAs that intend to transmit in the UL MU transmissions to compete and send ULR frames, etc.

FIG. 24 illustrates a flow diagram of example HE MU procedures using the example NDP MU control frame of FIG. 23. Operations 2401-2407 are similar to operations 2001-2007 in FIG. 20, respectively. In addition, in operation 2408, the STA may determine whether it is associated with the AP, and, if so, the STA may proceed to operation 2409. Otherwise, the STA proceeds to operation 2410 and checks the duration field and sets up its NAV accordingly.

In particular, the AP may prepare and transmit the HE NDP MU-Poll frame after it acquires the media and has traffic for multiple users, and STAs may receive this packet and begin packet detection using the L-STF and L-LTF fields. By decoding the L-SIG field, a STA may determine the length of this transmission (2401). STA may continue decoding the HE-NDP-SIG field and may notice that this is an NDP MAC frame when the NDP indication field is set to 1 (2404).

The STA may revisit the NDP Mac Frame body subfield (2406). Here, the NDP Mac Frame Type and MU mode subfields may indicate the MU-Poll frame and the MU transmission mode (2407). By checking the AP address, the STA may determine whether this frame is transmitted by an associated AP (2408). If the STA is associated with the AP, it may continue the decoding procedure in operation 2409. Otherwise, the STA may determine it is not part of the transmission, and it may check the duration field and set up NAV accordingly (2410).

Upon confirming that a STA is associated with the AP (2408), STAs who are associated with the AP and have data to transmit may take this opportunity to send UL frames. In another words, the frame shown in FIG. 23 is a type of broadcasted frame that is transmitted by the AP to all of associated STAs. Accordingly, it will be appreciated that all associated STAs are also intended receivers, such that the STAs may contend for one or more slots for an uplink transmission.

By checking the Contention ULR allowed field, the STA may determine whether a contention-based-ULR-transmission-slot is scheduled after a SIFS time following the current frame (2409) and may check the traffic buffer to determine whether it may perform a contention based ULR transmission with the data waiting for transmission in the buffer (2411). If the STA determines that a contention based UL transmission is not allowed in operation 2409, the STA may check the duration field and set up its NAV accordingly (2412).

With respect to a fourth example of a NDP MU-Poll frame body, the frame body may be included in a SIG field of an NDP MAC PPDU, which may use the structure given in the example HE NDP PPDU shown in FIG. 10, where NDP-SIG-A and NDP-SIG-B fields may be used.

Figure 25:
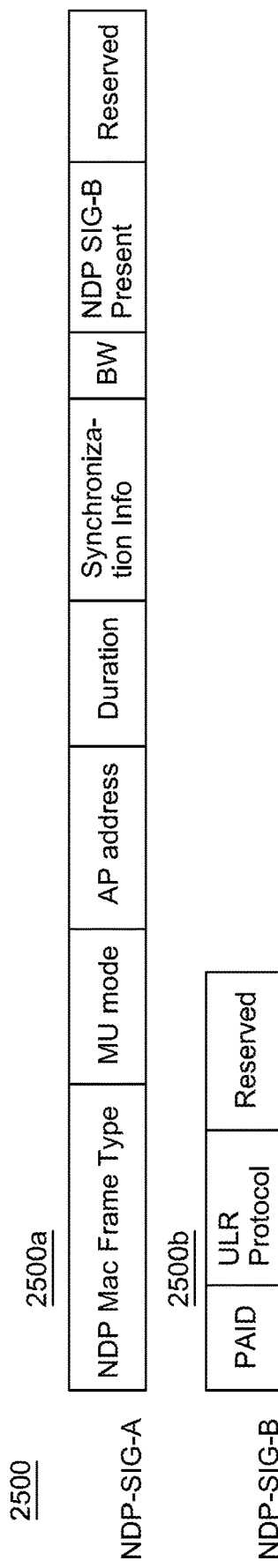
FIG. 25 is a diagram of a fourth example NDP MU-Poll frame body embodiment.

FIG. 25 is a diagram of the fourth example of a NDP MU-Poll frame body 2500. In the example illustrated in FIG. 25, the NDP frame body 2500a contained in the NDP-SIG-A field may include an NDP MAC Frame Type subfield, an MU mode subfield, an AP address/TA subfield, a Duration subfield, a Synchronization subfield, a BW subfield, an NDP-SIG-B present subfield and a Reserved subfield.

The NDP MAC Frame Type subfield may be used to indicate and/or identify the HE NDP MU-Poll frame. The MU mode subfield may be used to indicate or identify the MU transmission mode (e.g., MU-MIMO, OFDMA, single user (SU) or time domain multi-user aggregation). In an alternative example, the MU mode subfield may be combined with the NDP MAC Frame Type subfield. The AP address/TA subfield may be used to signal or provide the transmitter address. When the MU-Poll frame is transmitted by the AP, it may be used to signal or provide the AP address. The Duration subfield may be used to signal or provide the duration of the TXOP. Unintended STAs may use the Duration subfield to set their NAV.

The Synchronization Info subfield may include time/frequency/power synchronization-related-information transmitted from the AP to the STAs. Or the AP may use this subfield to require the STAs to respond with required time/frequency/power-synchronization-related-information. This subfield may be included in the NDP-SIG-A field (as shown in FIG. 15), and the synchronization information may be shared with all the STAs/users. In an alternative example, this subfield may be included in the NDP-SIG-B field and may include user specific/STA-dedicated-synchronization-information.

The BW subfield may be used to indicate BW, which may be an operation BW of the AP, an acquired BW in the TXOP or the sub-channel BW (where basic sub-channel size may be varied per transmission). The NDP-SIG-B present subfield may be used to signal whether a NDP-SIG-B field follows the NDP-SIG-A field. The Reserved subfield may be reserved for future use.

The user/resource-dedicated-MAC-frame-body 2500b included in the HE-NDP-SIG-B field may include a PAID subfield, a Response protocol subfield and a Reserved subfield. The PAID subfield may include a partial AID or another possible ID that may be used to represent the STA. The NDP-SIG-B field may be resource/user-dedicated, and, thus, the PAID field may be used to implicitly signal the resource allocation. For example, the NDP-SIG-B field transmitted on sub-channels k and n may carry the same PAID. Then the user indicated by the PAID may be allocated to sub-channels k and n.

The ULR protocol subfield may be included in the NDP-SIG-B field and may contain the user/STA-dedicated-response-protocol. In an alternative example, this subfield may be included in the NDP-SIG-A field, and the response protocol may be shared with all the STAs/users. This subfield may be similar to that defined in the second example HE NDP MU-Poll frame body embodiment. The Reserved subfield may be reserved for future use.

Figure 26:
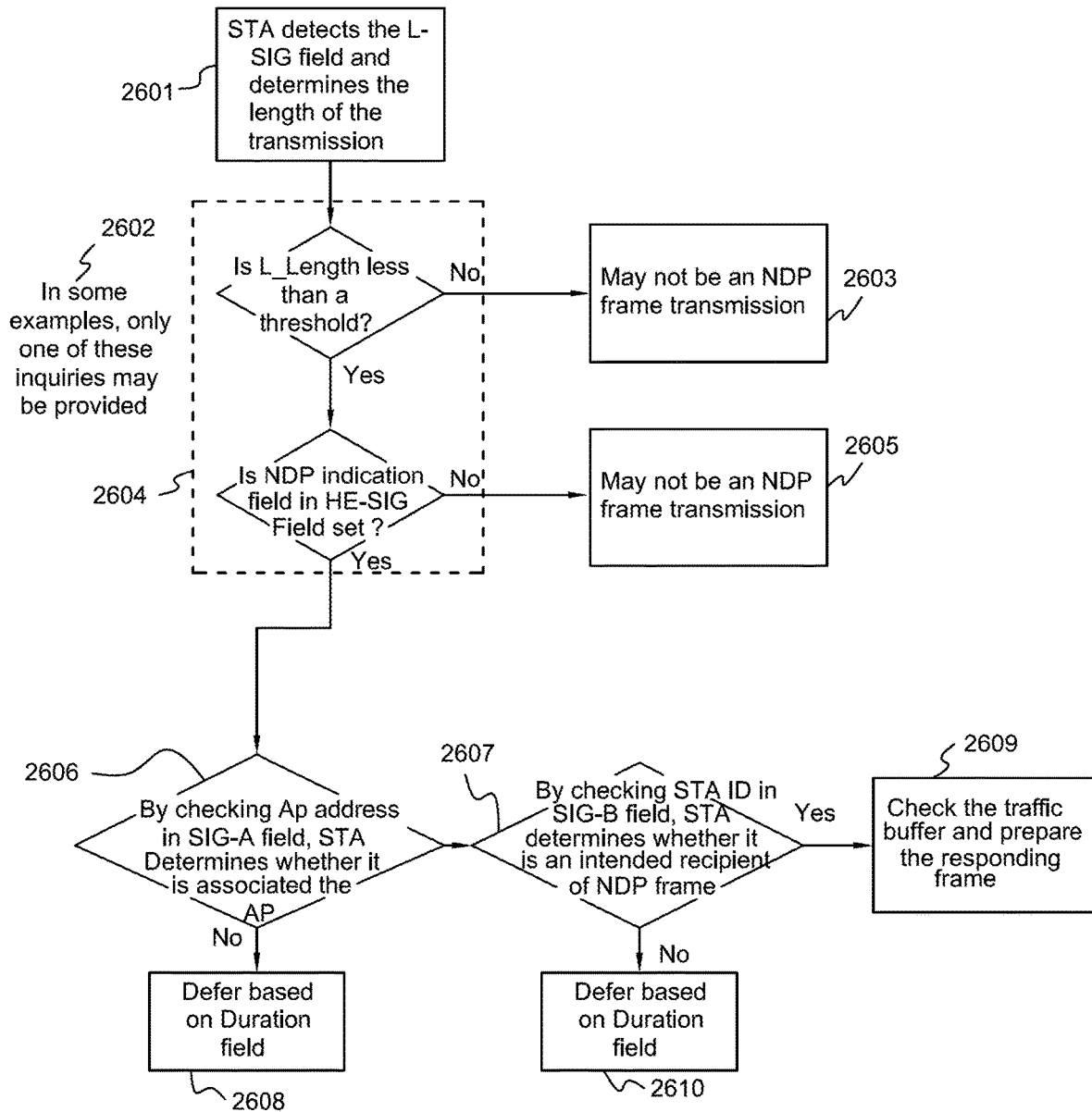
FIG. 26 is a flow diagram of example HE MU procedures using the example NDP MU control frame of FIG. 25.

FIG. 26 illustrates a flow diagram of example HE MU procedures using the example NDP MU control frame of FIG. 25. Some operations 2601-2610 in FIG. 26 may be similar to operations 2001-2010 in FIG. 20, with some exceptions related to the use of NDP SIG-A and NDP-SIG-B. For example, after determining that the frame is an NDP frame in 2604, the STA may check the AP address in the NDP SIG-A field to determine whether the STA is associated with the AP. If so, the STA proceeds to operation 2607, and, if not, the STA proceeds to operation 2608 and sets its NAV based on the duration field. In operation 2607, the STA checks the STA ID in the NDP SIG-B field to determine whether it is an intended recipient of the MU-transmission. If so, the STA proceeds to operation 2609, and, if not, the STA proceeds to operation 2601 and sets its NAV based on the duration field. In operation 2609, the STA checks its traffic buffer and determines whether it has traffic/data to transmit, and, if so, prepares the responding frame to transmit to the AP.

In particular, the AP may prepare and transmit the HE NDP MU-Poll frame after it acquires the media and has traffic for multiple users, and STAs may receive this packet and begin packet detection using the L-STF and L-LTF fields. By decoding the L-SIG field, the STA may determine the length of this transmission (2601). After determining that the length is less than a threshold (2602), the STA may continue decoding the HE-NDP-SIG-A field and may verify that this is an NDP MAC frame when the NDP indication field is set to 1 (2604). After confirming that the frame is an NDP frame, the STA may check the NDP MAC frame type subfield to determine the type of frame. The STA may check the AP address and determine whether it is associated with the AP (2606). The STA may also determine that the NDP-SIG-B field is present following the NDP SIG-A field when the NDP SIG-B Present field is 1, and this operation may be performed in conjunction with operation 2604 or 2606, or in between those operations. STAs that are associated with the AP may continue analyzing the NDP-SIG-B field by checking/reading the subfields therein (2607). STAs that are not associated with this AP may check the duration field and set their NAV accordingly (2608). They may also check the BW field to determine the operating sub-channels for the MU transmission. These operating sub-channels may be the sub-channels the AP acquired for transmission and may be the same as or less than the total operation bandwidth announced by the AP. In this way, the OBSS STAs may set their NAV on the utilized sub-channels and may be allowed to use the unused sub-channel(s) when they became available.

The STAs associated with the AP may continue analyzing the NDP-SIG-B field (2607). Since NDP-SIG-B fields transmitted on different sub-channels may be different, the STAs may need to decode all the NDP-SIG-B fields transmitted on all of the sub-channels. By checking the PAID field (or other possible identities) on each sub-channel, the STA may determine whether it is a STA assigned to that sub-channel (2607) (i.e., the STA determines whether it is an intended recipient). A STA may be assigned to multiple sub-channels. Thus, the STA may need to decode NDP SIG-B fields on all of the sub-channels. The STAs that are assigned to one or more sub-channels may check their traffic buffer and prepare the responding frames based on the information carried in both the NDP-SIG-A and NDP-SIG-B fields (2609). The STAs that are not assigned any sub-channel may set their NAV accordingly (2610).

Examples of an NDP MU UL Schedule frame body are described below. An NDP MU UL Schedule frame may be used by an AP to reserve a UL MU TXOP and schedule a UL MU transmission. The NDP MU UL Schedule frame may use a similar frame format as any of the NDP MU-RTS frame examples described above (e.g., see FIGS. 11, 13 and 15). In particular, any of the three example NDP MU-RTS frames may be applied to the NDP MU UL schedule frame directly, although, in some examples, the NDP Mac Frame Type and synchronization Info subfield may be different.

The NDP Mac Frame Type subfield may indicate that this is a NDP MU UL Schedule frame. The Synchronization Info subfield may include the suggested synchronization information, which may include at least one of a suggested transmit power, a suggested timing adjustment or a suggested frequency adjustment.

In an alternative example, the NDP MU UL Schedule frame may include extra uplink control information, which may include a Suggested/assigned Nsts subfield, a Suggested/assigned MCS subfield, a Suggested/assigned BW subfield, and a Maximum UL packet length subfield. The Suggested/assigned Nsts subfield may be used to indicate the suggested or assigned number of spatial time streams for each user. If the example NDP PPDU shown in FIG. 10 is used, this subfield may be carried in the NDP-SIG-B field. The Suggested/assigned MCS subfield may be used to indicate the suggested or assigned MCS for each user. If the example NDP PPDU shown in FIG. 10 is used, this subfield may be carried in the NDP-SIG-B field. The Suggested/assigned BW subfield may be used to indicate the suggested or assigned bandwidth for each user. This may be implicitly signaled by a group ID. If the example NDP PPDU shown in FIG. 10 is used, this subfield may be carried in the NDP-SIG-B field implicitly or explicitly. The Maximum UL packet length subfield may carry the maximum UL packet length. The AP may calculate the maximum UL packet length according to the UL traffic information transmitted in ULR frames and assigned MCS/Nsts. The STA may use this subfield to pad the uplink packet such that they arrive at the AP aligned.

Figure 27:
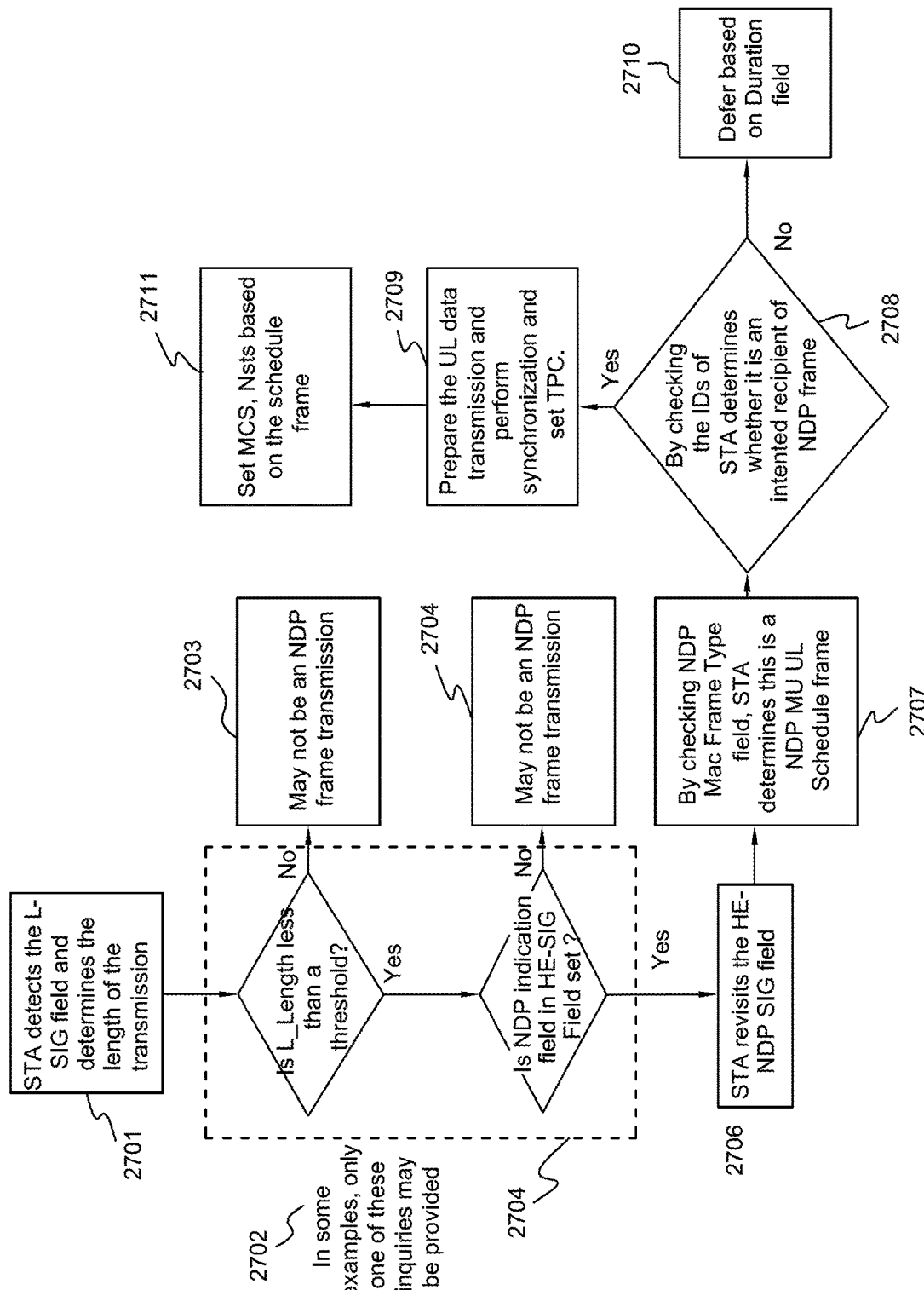
FIG. 27 is a flow diagram of example HE MU procedures using a NDP MU schedule control frame.

FIG. 27 illustrates a flow diagram of example HE MU procedures using a NDP MU UL schedule control frame. Some operations in FIG. 27 may be similar to operations in FIG. 12, and should be self-explanatory. For example, after determining that the frame is an NDP frame in 2704, the STA may revisit the NDP SIG field (2706) and check the NDP MAC frame type field to determine the frame type (2707). Upon determining that the frame is a NDP MU UL schedule control frame in operation 2707, the STA may decide to check/read the IDs in AP address, group ID and/or cluster ID (not shown) fields to determine whether the STA is an intended recipient of the NDP MAC frame (2708). If yes, the STA proceeds to operation 2709, and, if not, the STA proceeds to set its NAV based on the duration field in operation 2710. In operation 2709, the STA may prepare the UL data transmission and preform synchronization and set a transmission control protocol (TCP). Thereafter, the STA may use the MCS and Nsts assigned by the AP for the uplink traffic transmission (2711).

In particular, the AP may prepare the NDP MU UL Schedule frame following other MU control frames, such as the NDP MU-Poll and the NDP ULR exchanges. Alternatively, the AP may acquire the media and transmit this frame at a beginning of a UL MU TXOP. The STAs may check the AP address first and determine whether they are associated with the AP (2708). The STAs that are not associated with this AP may set or update the NAV setting accordingly (2710). If the BW field is carried in the HE NDP MU UL Schedule frame, the STAs may check their NAV on certain sub-channels indicated by the BW field. The STAs that are associated with the AP may continue the decoding procedure to operation 2709.

The STAs may check the Group ID/Cluster field (2708). The STAs that belong to the group/cluster may prepare the uplink transmission (2709). They may use the synchronization suggested from the AP to adjust the power, timing and frequency offset and set a TCP (2709). They may use the MCS and Nsts assigned by the AP for the uplink traffic transmission (2711). They may use the Maximum UL packet length as guidance for padding or truncating. The STAs that do not belong to the group or cluster may set or update their NAV accordingly (2710).

Examples of an NDP ULR frame body shown in FIG. 28 are described below. An NDP URL frame may be used by STA to signal or indicate the uplink traffic and request a UL TXOP. In an example, the AP may poll the STAs, and the STAs may reply with ULR frames. In another example, the STAs may transmit a ULR frame without polling from the AP (e.g., once every predetermined time period).

FIG. 28 is a diagram of an example HE NDP ULR frame body, which may be included in a SIG field of an NDP MAC PPDU. The NDP MAC PPDU may use the structure given in the example HE NDP MAC PPDU shown in FIG. 9.

In the example illustrated in FIG. 28, the NDP ULR MAC frame body field may include an NDP MAC Frame Type subfield, an MU mode subfield, a PAID subfield, a Traffic Info subfield, a Preferred MCS/Nsts subfield, a Duration subfield, and a Reserved subfield.

The NDP MAC Frame Type subfield may be used to indicate or identify that this is an HE NDP ULR frame. The MU mode subfield may be used to indicate or identify the MU transmission mode (e.g., MU-MIMO, OFDMA, SU or time domain multi-user aggregation). In an alternative example, the MU mode subfield may be combined with the NDP MAC Frame Type subfield. The PAID subfield may be used to signal or provide the transmitter address. When the ULR frame is transmitted by a STA, it may be used to signal or provide the STA address. The Traffic Info subfield may be used to signal or provide the uplink traffic information, which may include, for example, length, priority, traffic category or access category.

The Preferred MCS/Nsts subfield may be used by the STA to indicate or identify the preferred MCS and/or Nsts and the number of spatial time streams. The Preferred sub-channel subfield may be used by the STA to indicate or identify the preferred sub-channel or resource allocation. In an alternative example, instead of indicating or identifying the preferred sub-channel, this subfield may be used to indicate or provide the rank/order of the sub-channels or the detailed channel measurements, such as SINR or RSSI on each sub-channel.

The Duration subfield may be used to signal or provide the duration of the TXOP. Unintended STA may use this subfield to set their NAV. The Reserved subfield may be reserved for future use.

In another example, an HE NDP ULR frame may include additional subfields, such as a Synchronization Info subfield. The Synchronization Info subfield may include time/frequency/power-synchronization-related-information transmitted from the STA to the AP. The STA may use this subfield to require the AP to report time/frequency/power-synchronization-related-information.

The STA that has uplink traffic may transmit an NDP ULR frame when it acquires the media, or STAs that are polled by the AP may respond with an NDP ULR frame. On a condition that multiple STAs transmit NDP ULR frames simultaneously, the NDP ULR frames may be separated in the time, frequency, code or spatial domains.

FIG. 29 illustrates a flow diagram of example HE MU procedures using the example NDP MU control frame of FIG. 28. The STA may prepare the MU-ULR frame (2901), the STA may indicate NDP ULR frame in NDP Mac Frame Type field (2902), the STA may include the transmitter ID in the PAID/TA field (2903), the STA may indicate the preferred sub-channel and MCS/Nsts in the Sub-Channel Info and Preferred MCS/Nsts field (2904), the STA may indicate traffic length, priority, traffic category and access category in Traffic Info field (2905) and the STA may indicate TXOP duration in the Duration field (2906).

Upon receiving one or more NDP MAC ULR frames, the AP may detect all of the ULR frames and may use the collected preferred sub-channels information and traffic information for clustering/grouping. The AP may prepare an NDP UL MU Schedule frame to schedule an MU uplink transmission. The AP may use the collected synchronization information to suggest or set power, timing and frequency adjustment and may use the collected channel state information to suggest or set MCS and Nsts for the uplink transmission. Non-desired STAs may receive the NDP UL MU Schedule frame from the AP and may perform and update or set their NAV accordingly.

The examples described above use a SIFS as the inter-frame spacing. However, other inter-frame spacing techniques (e.g., reduced inter-frame space (RIFS)) may be used. Further, although the solutions described herein consider IEEE 802.11 specific protocols, it is understood that the solutions described herein are not restricted to this scenario and are also applicable to other wireless systems.

Analysis has been performed to compare the following three scenarios: baseline (single user transmission using the current version of IEEE 802.11ac) (SU), UL OFDMA transmission with full MAC control frames (OFDMA), and UL OFDMA transmission with the example NDP MAC frames described herein (NDP OFDMA). The assumptions for the analysis were that the AP is operating on an 80 MHz channel (for the SU case, the non AP STA is operating on the 80 MHz channel, and for the OFDMA case, four users are assumed and each has been assigned a 20 MHz sub-channel); two MSDU packet sizes were used (1408 bytes (large packet); and 36 bytes (small packet)); and UL OFDMA channel access includes MU Poll, ULR, MU Schedule, Uplink OFDMA data, and ACK frames. The analysis was also based on PHY layer simulations on Channel B, where the AP has 8 antennas and the STA have one antenna. However, it will be appreciate that the features and techniques disclosed herein may be applied to other scenarios without departing from the concepts disclosed herein.

Figure 30:
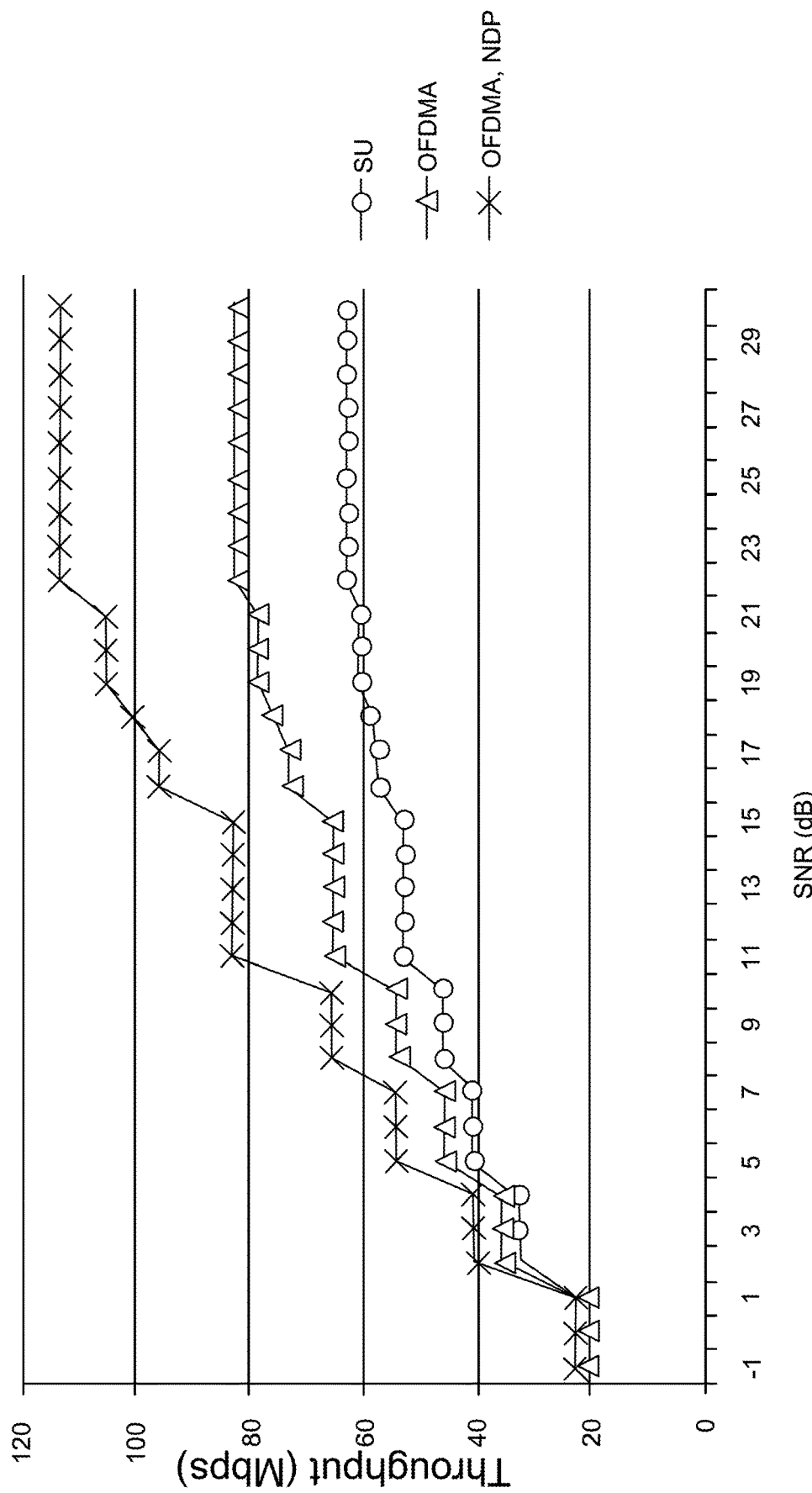
FIG. 30 is a graph showing the result of an analysis comparing baseline and uplink (UL) orthogonal frequency division multiple access (OFDMA) transmission for full MAC control frames and UL OFDMA transmission with the example NDP MAC frames described herein for large packets.

FIG. 30 is a graph showing the result of the analysis comparing the baseline, UL OFDMA transmission for full MAC control frames and UL OFDMA transmission with the example NDP MAC frames described herein for large packets.

Figure 31:
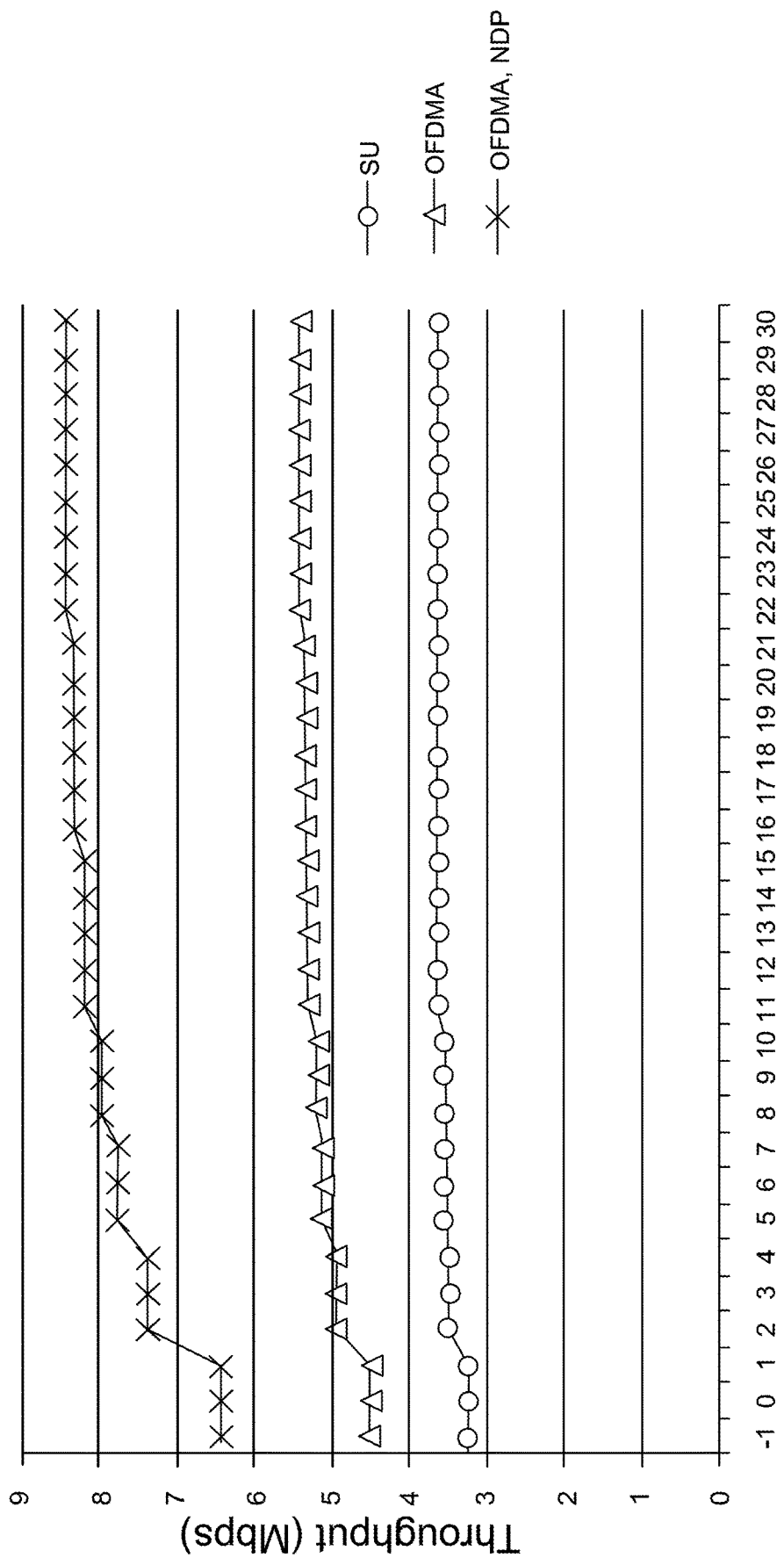
FIG. 31 is a graph showing the result of analysis comparing baseline and UL OFDMA transmission for full MAC control frames and UL OFDMA transmission with the example NDP MAC frames described herein for small packets.

FIG. 31 is a graph showing the result of the analysis comparing the baseline, UL OFDMA transmission for full MAC control frames and UL OFDMA transmission with the example NDP MAC frames described herein for small packets.

The results of the analysis show that throughput improvement is significant using the OFDMA NDP scheme.

As described in detail above, UL MU transmissions involve multiple users transmitting simultaneously. Exchanging traffic information, synchronizing among the multiple users, and allocating resources may need to be performed before the uplink data transmission. Thus, extra control frames may be required for UL MU transmissions. For example, an AP may need to poll the multiple STAs to determine whether the STAs have uplink traffic to transmit. Non-AP-STAs may request an uplink transmission opportunity from an AP. An AP may need to send a frame to schedule and trigger the UL MU transmission so that the multiple STAs may synchronize and prepare the uplink data transmission. An AP and STAs may need to exchange pre-correction parameters for UL MU synchronization. All of the above exemplary frame exchanges may be considered to be extra overhead and may cause the reduction of system throughput. In the examples described below, methods for evaluating the performance of the UL MU transmissions are described, which may be used to aid in the formulation of design criteria for any of the UL MU apparatuses, systems and methods described herein.

Figure 32:
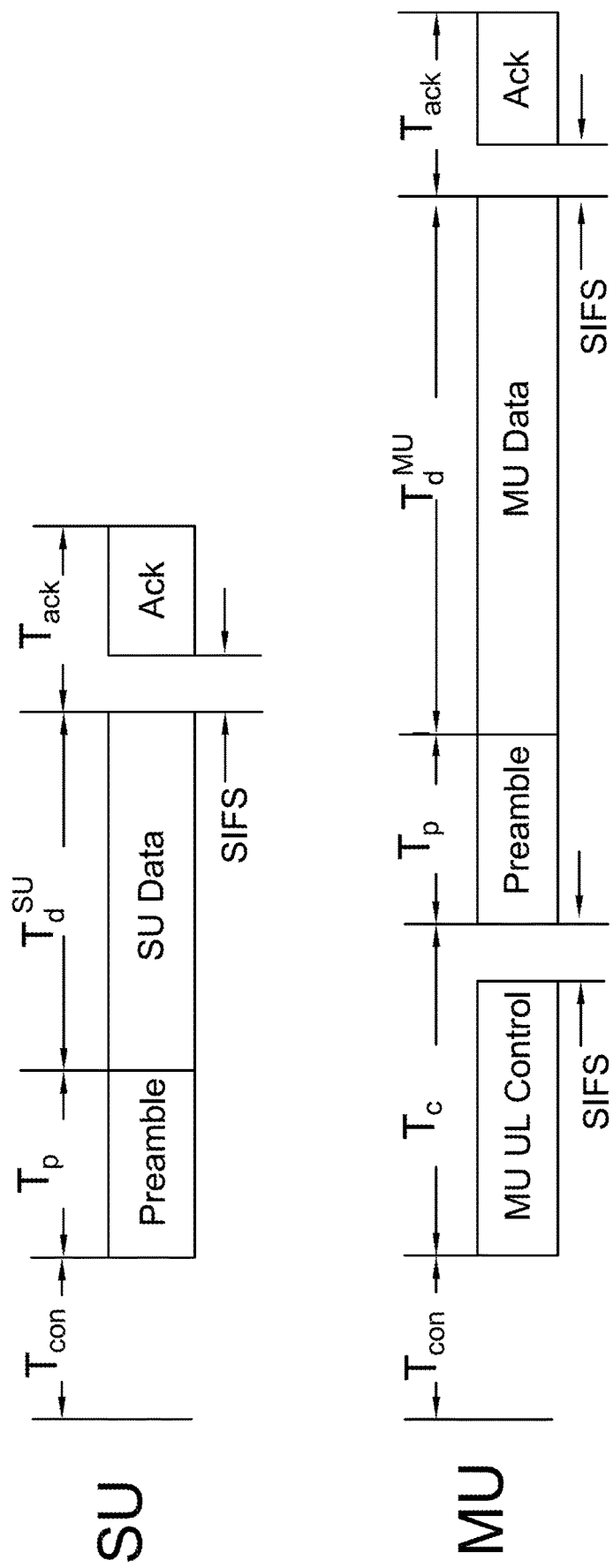
FIG. 32 is a diagram of an example abstracted model for single user (SU) transmissions and UL MU transmissions.

FIG. 32 is a diagram of an example abstracted model for SU transmissions and UL MU transmissions. In the example illustrated in FIG. 32, SU transmissions and UL MU transmissions are considered as part of the framework for analyzing how much of the overhead for UL MU control frames may be acceptable by comparing overhead for UL MU transmissions with the overhead for SU transmissions. In FIG. 32 and the equations that follow, $T_{con}$ is a contention duration, $T_p$ is a preamble duration, $T_d^{SU}$ is an SU data packet duration, $T_d^{SU}$ is an MU data packet duration, $T_c$ is a UL MU control frame duration (including a SIFS) and $T_{ack}$ is an acknowledgement frame duration (including a SIFS).

For SU transmissions, a STA may transmit a packet to another STA using a conventional CSMA/CA mechanism. The STA may compete for and acquire the wireless medium and then send a PPDU, which may include a preamble and a MAC frame. If the receiving STA decodes the packet successfully, it may send an acknowledgement frame to the first STA a SIFS time after reception of the data packet.

For UL MU transmissions, an AP or non-AP STA may compete for and acquire the wireless medium, and the AP and STAs may exchange control frames. The STAs may then begin an UL MU transmission to the AP. The AP, after decoding the packets, may transmit acknowledgement frames to the STAs. In the examples described herein, an OFDMA scheme is used as an example to perform overhead analysis for UL MU transmissions. However, designs and analyses for UL MU apparatuses, systems and methods may be adapted for any type of scheme.

In an example, in order to achieve a targeted throughput gain G, where $$\frac{Throughtput_{MU}}{Throughput_{SU}} \geq G,$$

the MU control frame may be designed in such a way that the total control frame duration satisfies:

$$T_c < \frac{(T_{con} + T_p + T_{ack})(N_U - G)}{G} + \frac{(1-G)}{G}T_d^{MU} \quad \text{(Equation 1)}$$

Based on Equation 1, the baseline requirement when G=1 is:

$$T_c < (T_{con} + T_p + T_{ack})(N_U - 1),$$

where $N_U$ is the number of users in the UL MU transmission.

Assuming that MU and SU transmissions have the same contention period, that packet size is fixed for both SU and MU transmissions, and that the MCS level is fixed for both SU and MU transmissions, the TXOP duration of the MU transmission is (where $D_{MU}$ represents the information bits transmitted by a UL STA, $R_{MU}$ represents the MCS rate by one UL STA, $D_{SU}$ represents the information bits transmitted by the SU transmission, $R_{SU}$ represents the MCS rate used in the SU transmission, $N_d$ represents the number of data tones and $T_{sym}$ represents the OFDM symbol duration including CP):

$$T_{MU} = T_{con} + T_c + T_p + T_d^{MU} + T_{ack};$$

and
the TXOP duration of the SU transmission is:

$$T_{SU} = T_{con} + T_p + T_d^{SU} + T_{ack}, \text{ where:}$$

$$T_d^{MU} = \left\lceil \frac{D_{MU} \cdot N_U}{R_{MU} \cdot N_d} \right\rceil T_{sym} \approx \frac{D_{MU} \cdot N_U}{R_{MU} \cdot N_d} T_{sym} \text{ and}$$

$$T_d^{SU} = \left\lceil \frac{D_{SU}}{R_{SU} \cdot N_d} \right\rceil T_{sym} \approx \frac{D_{SU} \cdot T_{sym}}{R_{SU} \cdot N_d}.$$

Based on the above, the maximum throughput for the MU transmission may be expressed as:

$$Th_{MU} = \frac{N_U \cdot D_{MU}}{T_{MU}} = \frac{N_U \cdot D_{MU}}{T_{con} + T_c + T_p + T_d^{MU} + T_{ack}}$$

$$\approx \frac{N_U \cdot D_{MU}}{T_{con} + T_c + T_p + \frac{D_{MU} \cdot N_u}{R_{MU} \cdot N_d} T_{sym} + T_{ack}}$$

$$= \frac{N_U \cdot D_{MU}}{(T_{con} + T_p + T_{ack}) + \frac{D_{MU} \cdot N_u}{R_{MU} \cdot N_d} T_{sym} + T_c}$$

The throughput for the SU transmission may be expressed as:

$$Th_{SU} = \frac{D_{SU}}{T_{SU}} = \frac{D_{SU}}{T_{con} + T_p + T_d^{SU} + T_{ack}}$$

$$\approx \frac{D_{SU}}{T_{con} + T_p + \frac{D_{SU} \cdot T_{sym}}{R_{SU} \cdot N_d} + T_{ack}}$$

$$= \frac{D_{SU}}{(T_{con} + T_p + T_{ack}) + \frac{D_{SU} \cdot T_{sym}}{R_{SU} \cdot N_d}}$$

Based on the assumptions described above, $R_{MU}=R_{SU}=R$ (SU and MU transmissions have the same MCS). If the common part of the equations for the throughput for the MU and SU transmissions $(T_{con}+T_p+T_{ack})RN_d$ is denoted as A, then the ratio of the throughput may be given by:

$$\frac{Th_{MU}}{Th_{SU}} = \frac{\frac{N_U D_{MU} RN_d}{A + N_U D_{MU} T_{sym} + T_c RN_d}}{\frac{D_{SU} RN_d}{A + D_{SU} T_{sym}}}$$

If a further assumption is made that $D_{MU}=D_{SU}=D$ (the packet sizes for each STA are the same), then:

$$\frac{Th_{MU}}{Th_{SU}} = \frac{\frac{N_U}{A + N_U DT_{sym} + T_c RN_d}}{\frac{1}{A + DT_{sym}}}$$

-continued $$= \frac{(A + DT_{sym})N_U}{A + N_U DT_{sym} + T_c RN_d}$$

MU transmissions may be considered to be desirable when the throughput ratio is expected to be greater than a certain threshold G (or G=1):

$$\frac{Th_{MU}}{Th_{SU}} = \frac{(A + DT_{sym})N_U}{A + N_U DT_{sym} + T_c RN_d} > G$$

Then:

$$(A + DT_{sym})N_U > G(A + N_U DT_{sym} + T_c RN_d)$$

In order to achieve a 100*(G−1) percent throughput gain, the duration of UL MU control frames should satisfy:

$$T_c < \frac{A(N_U - G) + (1 - G)DT_{sym}N_U}{CRN_d} =$$

$$\frac{(T_{con} + T_p + T_{ack})RN_d(N_u - G) + (1 - G)DT_{sym}N_U}{GRN_d} =$$

$$\frac{(T_{con} + T_p + T_{ack})(N_U - G)}{G} + \frac{(1 - G)DT_{sym}N_U}{GRN_d}$$

$$\frac{DT_{sym}N_U}{RN_d}$$

represents the duration of the data body for the MU transmission, which is equivalent to $T_d^{MU}$. Given this, the equation presented above for a UL MU control frame duration $T_c$ may be simplified as:

$$T_c < \frac{(T_{con} + T_p + T_{ack})(N_U - G)}{G} + \frac{(1 - G)}{G}T_d^{MU}$$

And the baseline requirement may be expressed as G+1 or:

$$T_c < (T_{con} + T_p + T_{ack})(N_U - 1)$$

To incorporate the above analysis into an IEEE 802.11 WiFi system, the assumptions may be adapted as provided in Table 1 below. The assumptions provided in Table 1 take the latest IEEE 802.11 development into consideration.

TABLE 1

| Notation | Description | Value |
| --- | --- | --- |
| $T_{con}$ | Contention duration | 27 μs (3 time slot) |
| $T_p$ | Preamble duration | 48 μs |
| $T_{ack}$ | Acknowledgement duration | 96 μs (BA + SIFS) |
| $N_U$ | # of users | 4/8 |
| $T_{sym}$ | OFDM symbol duration (including CP) | 16 μs |
| $N_d$ | # of data sub-carriers | 234 |

Figure 33:
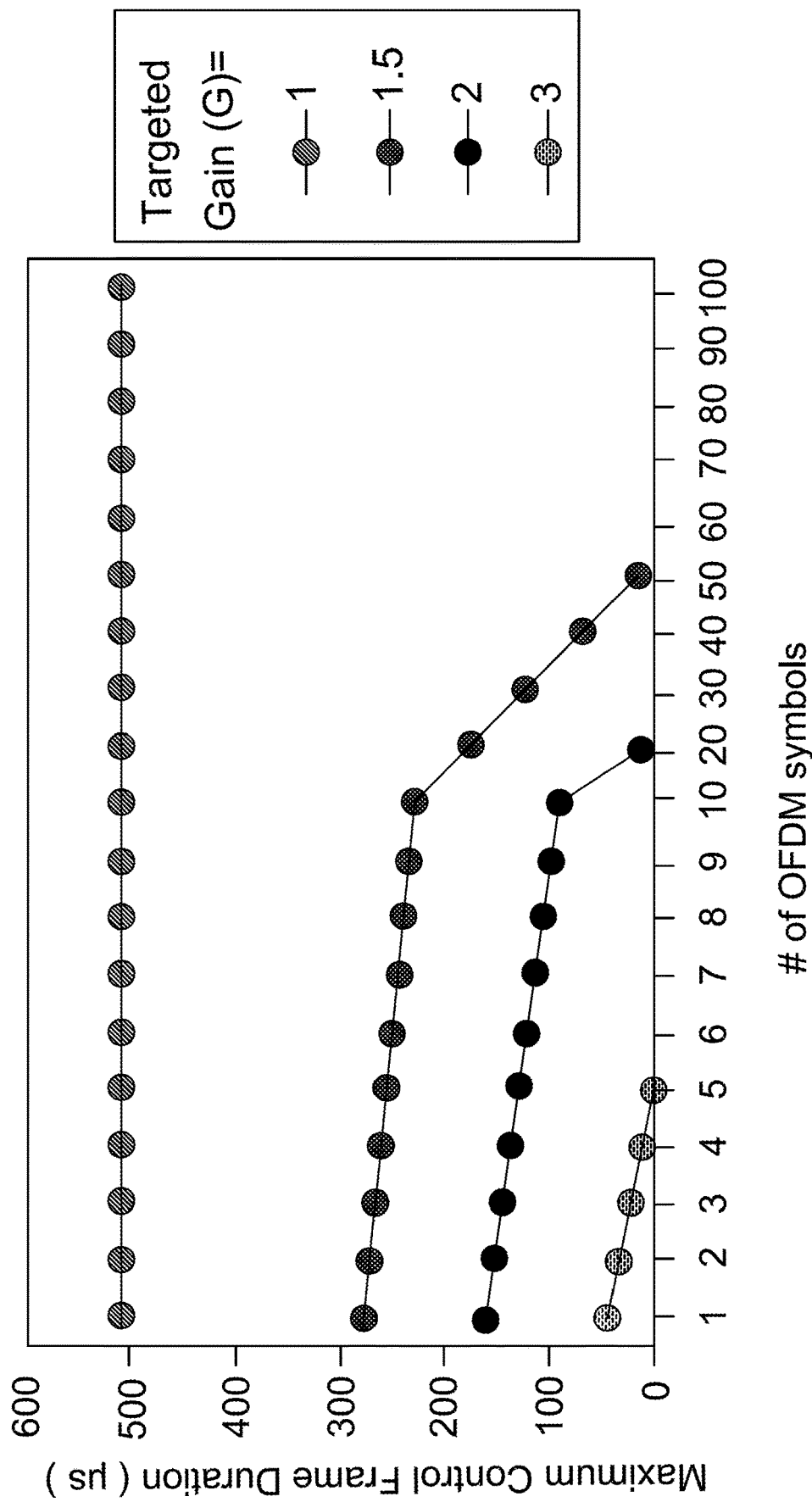
FIG. 33 is a graph representing example design requirements for different targeted gains for UL MU transmissions involving 4 OFDMA users.
Figure 34:
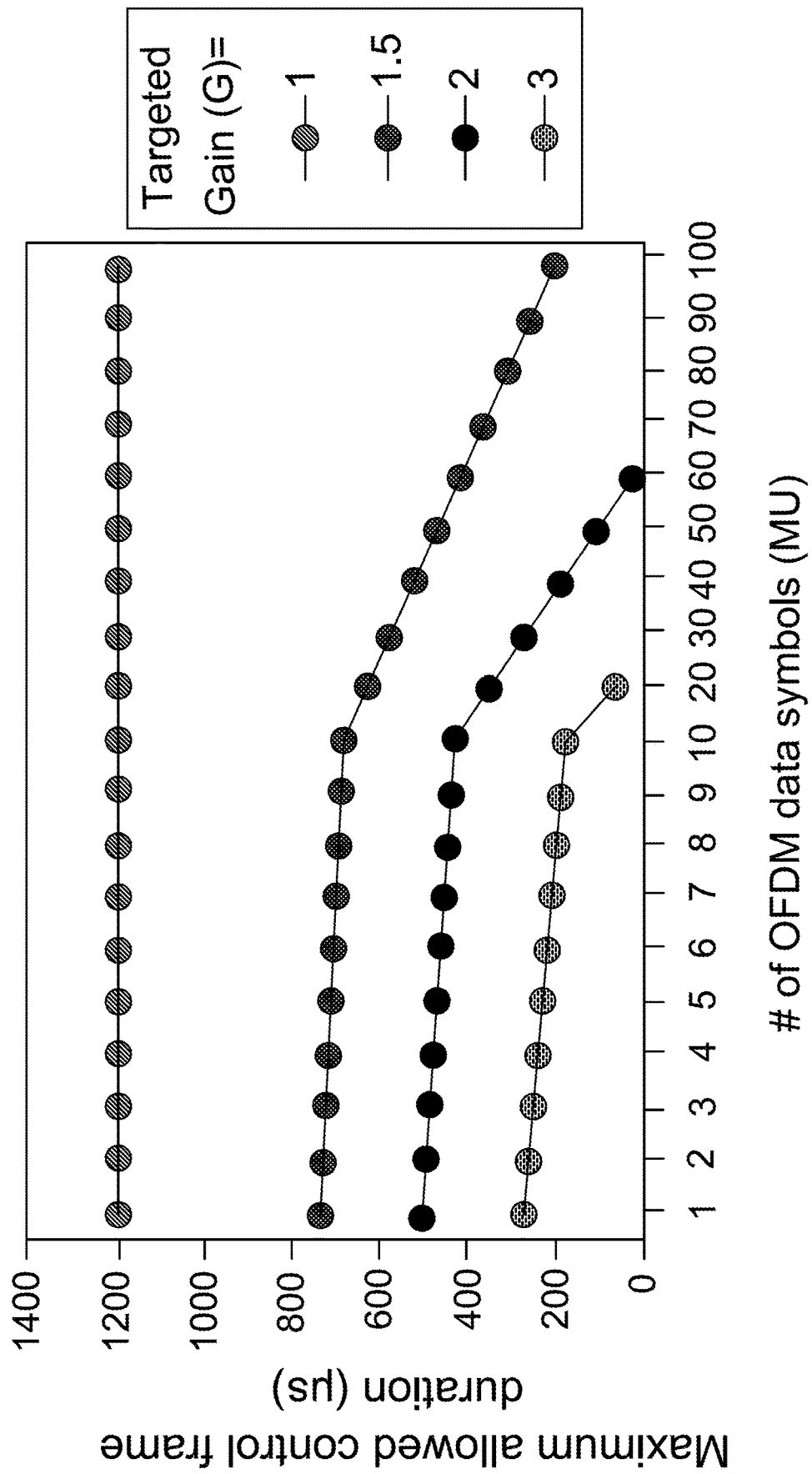
FIG. 34 is a graph representing example design requirements for different targeted gains for UL MU transmissions involving 8 OFDMA users.

FIG. 33 is a graph representing example design requirements for different targeted gains for UL MU transmissions involving 4 OFDMA users. FIG. 34 is a graph representing example design requirements for different targeted gains for UL MU transmissions involving 8 OFDMA users. The examples illustrated in FIGS. 33 and 34 show the curves of maximum allowed control frame duration versus OFDM data packet size with various given targeted throughput gains.

In the examples represented by FIGS. 33 and 34, when the targeted throughput threshold G is set to 1, which means that the throughput of MU transmissions is expected to be as efficient as that of SU transmissions, the maximum allowed control frame duration is not a function of the OFDM data packet size; the OFDM data packet size is a function of packet size (in bits), MCS rate, and number of sub-carriers per OFDM symbol per user. The maximum allowed control frame duration is 513 μs and 1197 μs for 4 user and 8 user OFDMA transmissions, respectively. If the design target G, the targeted throughput gain threshold for MU, is increased, the maximum allowed control frame duration may decrease significantly.

Further, in the examples represented by FIGS. 33 and 34, with G greater than 1, the maximum allowed control frame duration, $T_c$, is a function of the OFDM data packet size. For example, with 4 user OFDMA, the maximum allowed control frame duration is 280 μs, 163 μs and 46 μs when G is set to 1.5, 2 and 3, respectively, if the MU data packet is contained in 1 OFDM symbol. When a larger packet is considered (e.g., 20 OFDM symbols for an MU data transmission), the maximum allowed control frame duration may be 178 μs if 1.5 time MU throughput gain is targeted. If 2 time MU throughput gain is expected, then the entire control overhead for UL MU transmission may need to be limited within 11 μs. And it may not be possible to achieve 3 time MU throughput gain with a 4 user OFDMA transmission and 20 MU data symbols.

For 8 OFDMA transmissions, the MU transmission may be more efficient since more users may share the same contention period and preamble duration. Moreover, the acknowledgment signaling may be simultaneous. Thus, the system may tolerate longer control frame overhead. As illustrated in FIG. 34, for example, with a small MU packet size (e.g., 1 OFDM symbol), the maximum allowed control frame duration may be 736 μs, 505 μs and 274 μs when G is set to 1.5, 2 and 3, respectively. With a larger MU packet size (e.g., 20 OFDM symbols), the maximum allowed control frame duration may be 634 μs, 353 μs and 72 μs when G is set to 1.5, 2 and 3, respectively.

Figure 35:
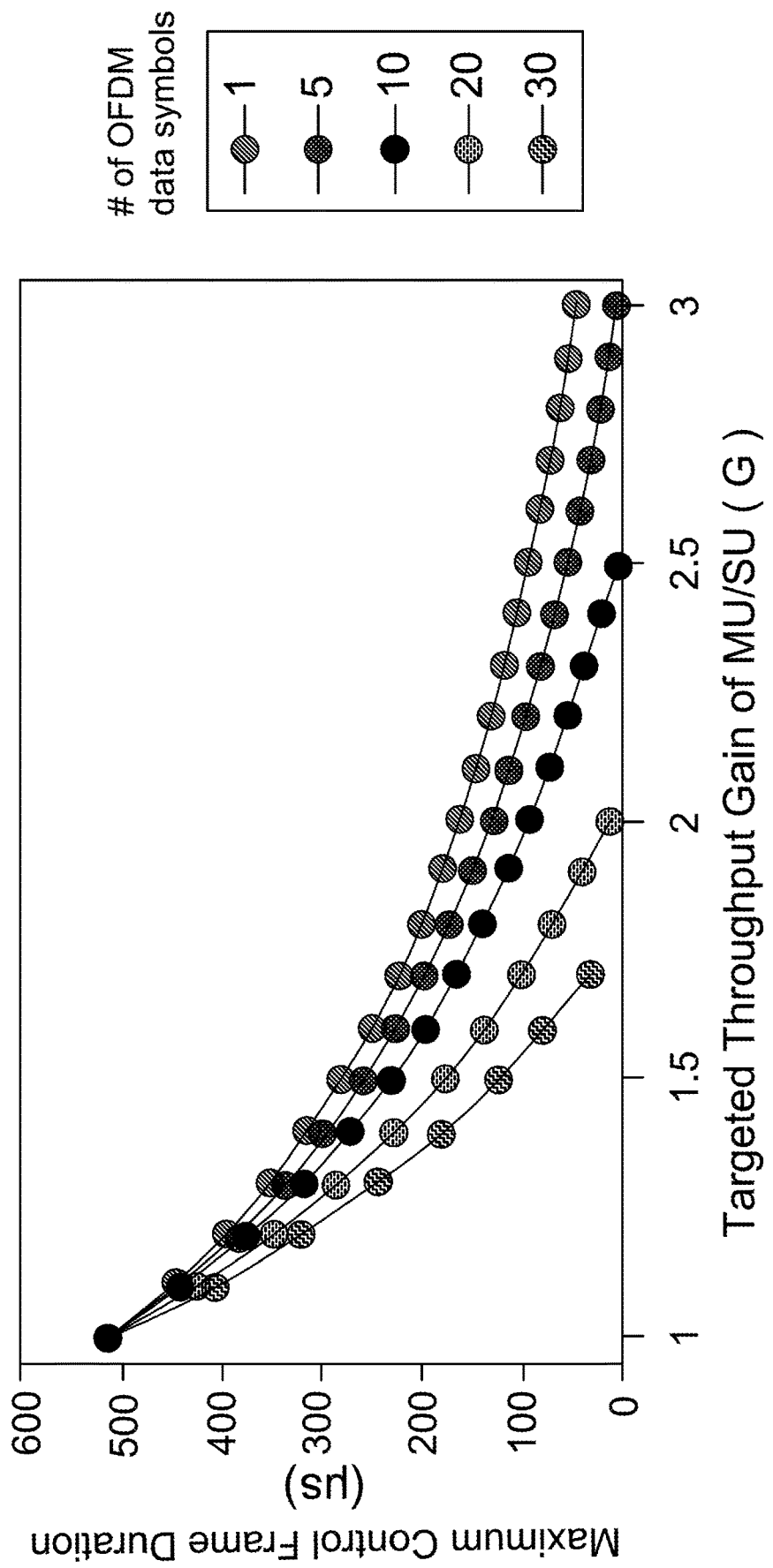
FIG. 35 is a graph representing a design requirement for UL MU control frames with 4 OFDMA users when data symbol length is fixed.

FIG. 35 is a graph representing a design requirement for UL MU control frames with 4 OFDMA users when data symbol length is fixed.

Figure 36:
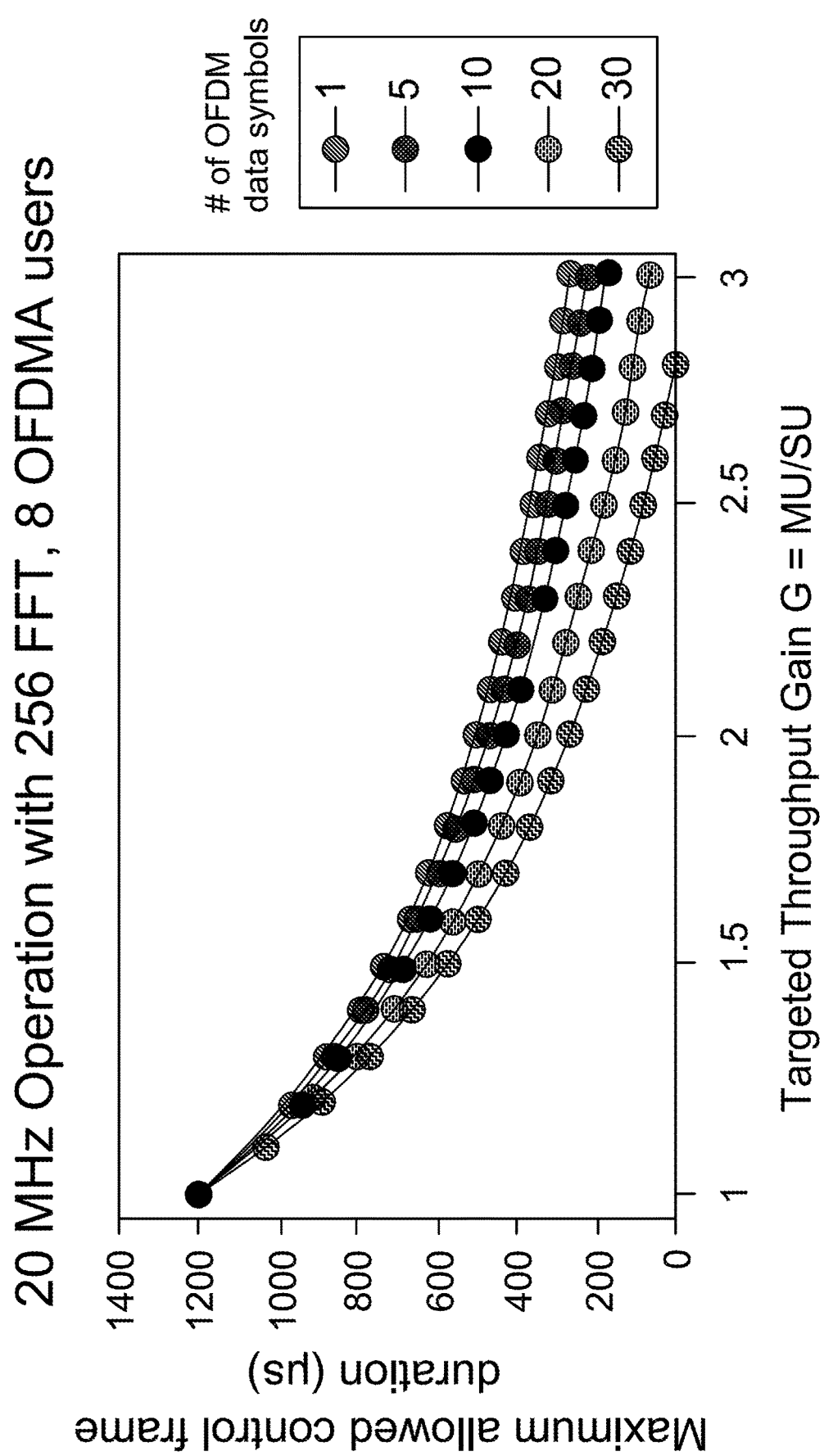
FIG. 36 is a graph representing a design requirement for UL MU control frames with 8 OFDMA users when data symbol length is fixed.

FIG. 36 is a graph representing a design requirement for UL MU control frames with 8 OFDMA users when data symbol length is fixed.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, STA, terminal, base station, RNC, or any host computer.

What is claimed is:

1. A method for use in a station (STA), the method comprising:
   receiving, from an access point (AP), a poll frame including an association identifier (AID) indicating one of a plurality of STAs that are scheduled for multi-user (MU) uplink transmission using a plurality of allocated resources; and
   transmitting, to the AP, on a condition that the received AID corresponds to an AID associated with the STA, a null data packet (NDP) uplink response frame over a resource assigned, based on the received AID, from the plurality of allocated resources, wherein the NDP uplink response frame indicates that the STA has uplink data to transmit.

2. The method of claim 1, wherein the received AID is a partial AID.

3. The method of claim 1, wherein the resource assigned is a sub-channel and the sub-channel is distinguished from another sub-channel in which another NDP uplink response frame is simultaneously transmitted to the AP from another STA.

4. The method of claim 3, wherein the sub-channel and the another sub-channel are separated in frequency.

5. The method of claim 1, wherein an interframe space between the NDP uplink response frame and the poll frame is a short interframe space (SIFS).

6. The method of claim 1, wherein the plurality of allocated resources are Orthogonal Frequency Divisional Multiple Access (OFDMA) resources.

7. A station (STA) comprising:
   a receiver configured to receive, from an access point (AP), a poll frame including an association identifier (AID) indicating one of a plurality of STAs that are scheduled for multi-user (MU) uplink transmission over a plurality of allocated resources; and
   a transmitter configured to transmit, to the AP, on a condition that the received AID corresponds to an AID associated with the STA, a null data packet (NDP) uplink response frame over a resource assigned, based on the received AID, from the plurality of allocated resources, wherein the NDP uplink response frame indicates that the STA has uplink data to transmit.

8. The STA of claim 7, wherein the received AID is a partial AID.

9. The STA of claim 7, wherein the resource assigned is a sub-channel and the sub-channel is distinguished from another sub-channel in which another NDP uplink response frame is simultaneously transmitted to the AP from another STA.

10. The STA of claim 9, wherein the sub-channel and the another sub-channel are separated in frequency.

11. The STA of claim 7, wherein an interframe space between the NDP uplink response frame and the poll frame is a short interframe space (SIFS).

12. The STA of claim 7, wherein the plurality of allocated resources are Orthogonal Frequency Divisional Multiple Access (OFDMA) resources.

* * * * *